US011170764B2

(12) United States Patent
Woo et al.

(10) Patent No.: US 11,170,764 B2
(45) Date of Patent: Nov. 9, 2021

(54) ELECTRONIC DEVICE FOR PROCESSING USER UTTERANCE

(71) Applicant: Samsung Electronics Co., Ltd., Gyeonggi-do (KR)

(72) Inventors: Kyoung Gu Woo, Seoul (KR); Ho Jun Jaygarl, Gyeonggi-do (KR); Kyu Young Kim, Gyeonggi-do (KR); Jin Woong Kim, Gyeonggi-do (KR); Hyun Jin Park, Gyeonggi-do (KR); Jae Yung Yeo, Gyeonggi-do (KR)

(73) Assignee: Samsung Electronics Co,. Ltd

( * ) Notice: Subject to any disclaimer, the term of this patent is extended or adjusted under 35 U.S.C. 154(b) by 205 days.

(21) Appl. No.: 16/609,635

(22) PCT Filed: Apr. 27, 2018

(86) PCT No.: PCT/KR2018/004909
§ 371 (c)(1),
(2) Date: Oct. 30, 2019

(87) PCT Pub. No.: WO2018/203620
PCT Pub. Date: Nov. 8, 2018

(65) Prior Publication Data

US 2020/0152181 A1 May 14, 2020

(30) Foreign Application Priority Data

Apr. 30, 2017 (KR) ........................ 10-2017-0055832

(51) Int. Cl.
*G10L 15/00* (2013.01)
*G10L 15/183* (2013.01)
(Continued)

(52) U.S. Cl.
CPC ............ *G10L 15/183* (2013.01); *G10L 15/22* (2013.01); *G10L 15/28* (2013.01); *G06F 40/30* (2020.01);
(Continued)

(58) Field of Classification Search
CPC combination set(s) only.
See application file for complete search history.

(56) References Cited

U.S. PATENT DOCUMENTS 6,889,191 B2 5/2005 Rodriguez et al.
7,321,857 B2 1/2008 Rodriguez et al.
(Continued)

FOREIGN PATENT DOCUMENTS

KR 101689818 12/2016

OTHER PUBLICATIONS

PCT/ISA/210 Search Report issued on PCT/KR2018/004909, pp. 5.
PCT/ISA/237 Written Opinion issued on PCT/KR2018/004909, pp. 9.

*Primary Examiner* — Vu B Hang
(74) *Attorney, Agent, or Firm* — The Farrell Law Firm, P.C.

(57) ABSTRACT

An electronic device and method for utilizing same are disclosed, the electronic device including a touch screen display disposed in the housing and exposed through a first portion of the housing; a microphone disposed in the housing and exposed through a second portion of the housing; at least one speaker disposed in the housing and exposed
(Continued)

through a third portion of the housing; a communication circuit disposed in the housing; a processor disposed in the housing and electrically connected to the display, the microphone, the speaker, and the communication circuit; and a memory disposed in the housing, electrically connected to the processor, and configured to store application programs including a first application program, a second application program and a third application program, the second application program and the third application program include at least one common function.

15 Claims, 18 Drawing Sheets

(51) Int. Cl.

| | |
|---|---|
| ***G10L 15/22*** | (2006.01) |
| ***G10L 15/28*** | (2013.01) |
| *G10L 15/08* | (2006.01) |
| *G10L 15/30* | (2013.01) |
| *G06F 40/30* | (2020.01) |
| *G10L 15/26* | (2006.01) |

(52) U.S. Cl.

CPC ............. *G10L 15/08* (2013.01); *G10L 15/26* (2013.01); *G10L 15/30* (2013.01)

(56) References Cited

U.S. PATENT DOCUMENTS

| | | | |
|---|---|---|---|
| 7,693,718 | B2 | 4/2010 | Jan et al. |
| 7,761,591 | B2 | 7/2010 | Graham |
| 8,200,492 | B2 | 6/2012 | Jan et al. |
| 8,667,479 | B2 | 3/2014 | Johnsson et al. |
| 8,849,660 | B2 | 9/2014 | Rodriguez et al. |
| 9,171,066 | B2 | 10/2015 | Hebert et al. |
| 9,495,969 | B2 | 11/2016 | Rodriguez et al. |
| 9,552,816 | B2 | 1/2017 | VanLund et al. |
| 9,966,068 | B2 | 5/2018 | Cash et al. |
| 10,127,011 | B2 | 11/2018 | Bang et al. |
| 10,192,549 | B2 | 1/2019 | Kannan et al. |
| 2003/0105637 | A1 | 6/2003 | Rodriguez et al. |
| 2005/0144009 | A1 | 6/2005 | Rodriguez et al. |
| 2007/0143398 | A1 | 6/2007 | Graham |
| 2007/0179787 | A1 | 8/2007 | Jan et al. |
| 2008/0091434 | A1 | 4/2008 | Rodriguez et al. |
| 2008/0183477 | A1 | 7/2008 | Jan et al. |
| 2011/0276957 | A1 | 11/2011 | Johnsson et al. |
| 2014/0136183 | A1 | 5/2014 | Hebert et al. |
| 2014/0343951 | A1 | 11/2014 | Rodriguez et al. |
| 2014/0365227 | A1 | 12/2014 | Cash et al. |
| 2016/0034253 | A1 | 2/2016 | Bang et al. |
| 2016/0155442 | A1 | 6/2016 | Kannan et al. |
| 2016/0180853 | A1 | 6/2016 | VanLund et al. |
| 2016/0188150 | A1 | 6/2016 | Abida et al. |
| 2016/0372112 | A1 | 12/2016 | Miller et al. |
| 2018/0358015 | A1 | 12/2018 | Cash et al. |
| 2019/0012142 | A1 | 1/2019 | Bang et al. |

ELECTRONIC DEVICE FOR PROCESSING USER UTTERANCE

PRIORITY

This application is a National Phase Entry of PCT International Application No. PCT/KR2018/004909 which was filed on Apr. 27, 2018, and claims priority to Korean Patent Application No. 10-2017-0055832, which was filed on Apr. 30, 2017, the content of each of which is incorporated herein by reference.

TECHNICAL FIELD

Embodiments disclosed in this specification relates to a technology for processing a user's utterance.

BACKGROUND ART

In addition to a conventional input scheme using a keyboard or a mouse, electronic devices have recently supported various input schemes such as a voice input and the like. For example, the electronic devices such as a smartphone or a tablet PC may recognize the user's voice entered while a speech recognition service is executed and then may execute an operation corresponding to a voice input or may provide the found result.

Nowadays, the speech recognition service is being developed based on a technology processing a natural language. The technology for processing a natural language refers to a technology that grasps the intent of the user utterance and provides the user with the result matched with the intent.

DISCLOSURE

Technical Problem

Because the conventional speech recognition service displays only the result according to a user's input when recognizing and processing the user's voice, the conventional speech recognition service may process only the user's voice, such as executing a program but may fail to process a user input to make a request for the execution of a plurality of applications.

The voice predetermined in a specified format needs to be entered such that the conventional speech recognition service processes a plurality of applications. The speech recognition service may have a database for processing a complex user input; this may not be suitable for a user terminal that is being miniaturized. Furthermore, even though the speech recognition service has a vast database, it may be difficult to provide a service that processes a user input by managing information for executing a newly added app.

Various embodiments of the disclosure suggest a method of generating a rule for sequentially arranging states of an electronic device corresponding to a user utterance by combining rules for executing the action of each app.

Technical Solution

According to an embodiment disclosed in this specification, an electronic device may include housing, a touch screen display positioned inside the housing and exposed through a first portion of the housing, a microphone positioned inside the housing and exposed through a second portion of the housing, at least one speaker positioned inside the housing and exposed through a third portion of the housing, a communication circuit positioned inside the housing, a processor positioned inside the housing and electrically connected to the display, the microphone, the at least one speaker, and the communication circuit, and a memory positioned in the housing and electrically connected with the processor. The memory may store a plurality of application programs including a first application program, a second application program, and a third application program, and the memory may store instructions that, when executed, cause the processor, in a first operation, to receive a first user input via at least one of the display and the microphone, to transmit first data associated with the first user input to an external server via the communication circuit, to receive a first response from the external server via the communication circuit, to perform the first task by causing the electronic device to have the states of the first sequence, in a second operation, to receive the second user input via at least one of the display and the microphone, to transmit second data associated with the second user input to an external server via the communication circuit, to receive a second response from the external server via the communication circuit, and to perform the second task by causing the electronic device to have the states of the second sequence. The second application program and the third application program may include at least one common function. The first user input may include a first request for performing a first task, using the first application program and the second application program. The second user input may include a second request for performing a second task, using the first application program and the third application program. The first response may include information about a first sequence of states of the electronic device for performing the first task and a first combination of a first identifier associated with the first application program and a second identifier associated with the second application program. The second response may include information about a second sequence of states of the electronic device for performing the second task and a second combination of the first identifier associated with the first application program and a third identifier associated with the third application program.

Furthermore, according to an embodiment disclosed in this specification, a server may include a communication interface, a processor electrically connected to the communication interface, and a memory electrically connected to the processor and storing instructions. The instructions may, when executed, cause the processor to receive first data associated with a first user input for performing a first task using a first application program and a second application program via the communication interface from an external device including a first application program, a second application program, and a third application program, to select a domain associated with the first application program based on the first data, to select a first sequence of states for the external device based on the first data, to tag first parameters extracted from the first data, to select a second sequence for execution of the external device based on at least part of the tagged first parameters, and to transmit a first response including a combination of the first sequence and the second sequence to the external device via the communication interface. The second application program and the third application program may include at least one common function. The first sequence may include states of the first application program. The second sequence may include states of the second application program.

Moreover, according to an embodiment disclosed in this specification, an electronic device may include housing, a touch screen display positioned inside the housing and exposed through a first portion of the housing, a microphone positioned inside the housing and exposed through a second portion of the housing, at least one speaker positioned inside the housing and exposed through a third portion of the housing, a communication circuit positioned inside the housing, a processor positioned inside the housing and electrically connected to the display, the microphone, the at least one speaker, and the communication circuit, and a memory positioned in the housing and electrically connected with the processor. The memory may store a plurality of application programs including a first application program, a second application program, and a third application program. The memory may store instructions that, when executed, cause the processor to receive a first user input via at least one of the display and the microphone, to transmit first data associated with the first user input to an external server via the communication circuit, to receive a first response from the external server via the communication circuit, to select a second sequence of states of the electronic device for performing a remaining of the first task, based on at least part of the tagged first parameters, and to perform the first task by causing the electronic device to have the states of the first sequence and the second sequence. The second application program and the third application program may include at least one common function. The first user input may include a first request for performing a first task, using the first application program and the second application program. The first response may include information about a first sequence of states of the electronic device for performing at least part of the first task, an identifier associated with the first application program, and a first parameter tagged after being extracted from the first data.

Advantageous Effects

According to embodiments disclosed in the specification, an intelligence server may generate a path rule (or full path rule) corresponding to a user input in real time by combining the path rules corresponding to the functions of an app, thereby reducing the amount of information to be stored in a database and efficiently processing the user input corresponding to the newly added path rule, organically using the path rule newly added to the database together with the existing path rule.

Moreover, an intelligence server may generate a path rule in which a user terminal is capable of being executed in the current state, based on the state of the user terminal, thereby avoiding the conflict capable of occurring when the user terminal executes the action of an app.

Besides, a variety of effects directly or indirectly understood through the disclosure may be provided.

DESCRIPTION OF DRAWINGS

FIG. 13 is a flowchart illustrating a method in which a user terminal processes a user input, according to an embodiment.

With regard to description of drawings, the same or similar elements may be marked by the same or similar reference numerals.

MODE FOR INVENTION

Hereinafter, various embodiments of the disclosure may be described to be associated with accompanying drawings. Accordingly, those of ordinary skill in the art will recognize that modification, equivalent, and/or alternative on the various embodiments described herein can be variously made without departing from the scope and spirit of the disclosure.

Before describing an embodiment of the disclosure, an integrated intelligence system to which an embodiment of the disclosure is applied will be described.

Figure 1:
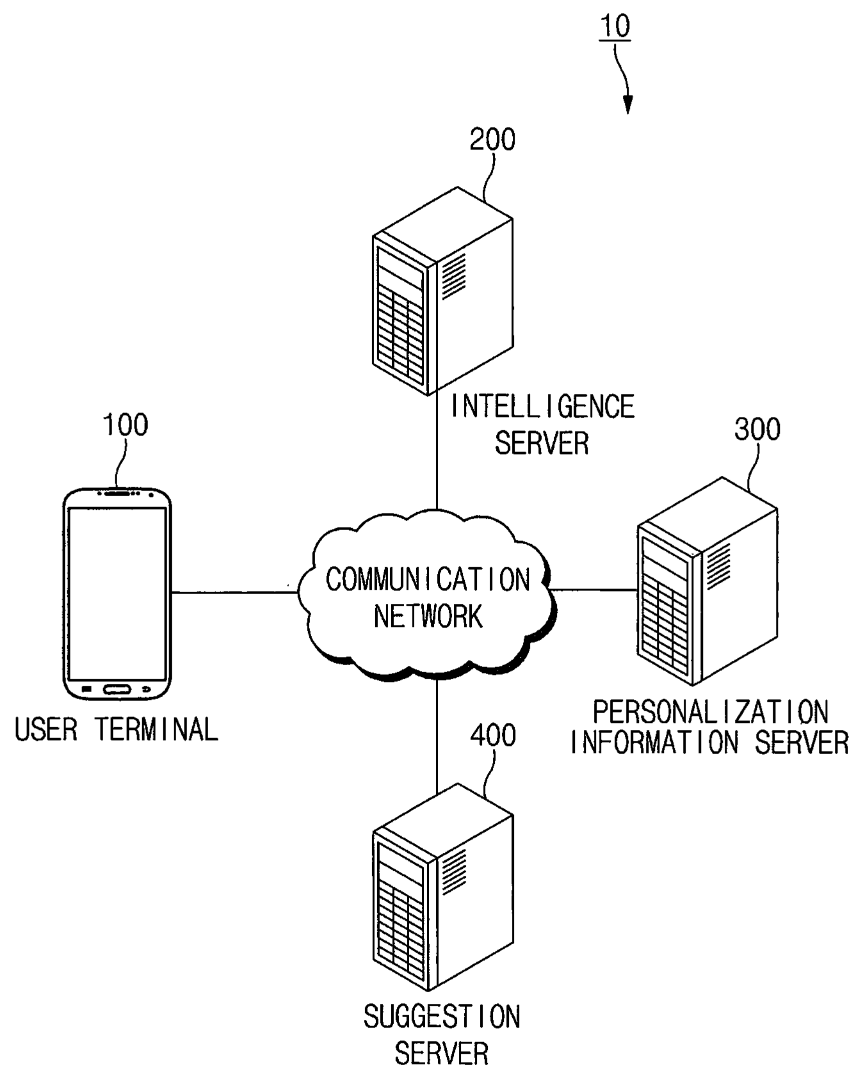
FIG. 1 is a view illustrating an integrated intelligence system, according to various embodiments.

FIG. 1 is a view illustrating an integrated intelligence system, according to various embodiments.

Referring to FIG. 1, an integrated intelligence system 10 may include a user terminal 100 (e.g., the electronic device 1300 of FIG. 13), an intelligence server 200 (e.g., the intelligence server 1308 of FIG. 13), a personalization information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the received voice input to text data. According to an embodiment, the intelligence server 200 may generate (or select) a path rule based on the text data. The path rule may include information about an action (or an operation or a task) for performing the function of an app or information about a parameter necessary to perform the action. For example, the path rule may include the sequence of states for executing an action. The user terminal 100 may be sequentially changed to the states included in the path rule. The user terminal 100 may execute the action for becoming in a state included in the path rule. Accordingly, the user terminal 100 may receive the path rule, may select an app depending on the path rule, and may execute an action included in the path rule in the selected app.

For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

The personalization information server 300 may include a database in which user information is stored. For example, the personalization information server 300 may receive the user information (e.g., context information, information about execution of an app, or the like) from the user terminal 100 and may store the user information in the database. The intelligence server 200 may receive the user information from the personalization information server 300 over the communication network and may use the user information when generating a path rule associated with the user input. According to an embodiment, the user terminal 100 may receive the user information from the personalization information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personalization information server 300. The user terminal 100 may receive information about the function to be provided from the suggestion server 400 over the communication network and may provide the information to the user.

Figure 2:
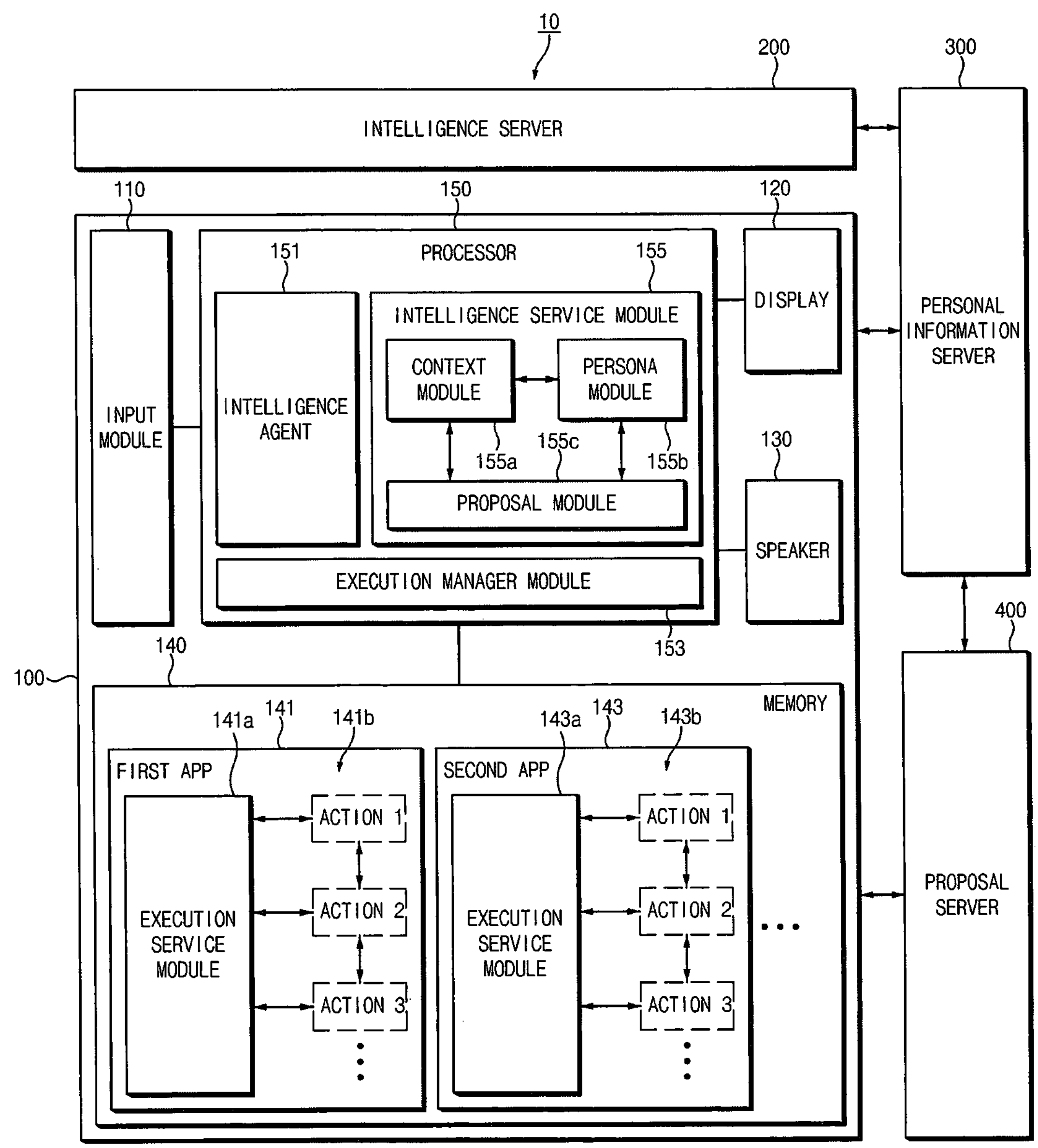
FIG. 2 is a block diagram illustrating a user terminal of an integrated intelligence system, according to an embodiment.

FIG. 2 is a block diagram illustrating a user terminal of an integrated intelligence system, according to an embodiment.

Referring to FIG. 2, the user terminal 100 may include an input module 110, a display 120, a speaker 130, a memory 140, or a processor 150. The user terminal 100 may further include housing, and elements of the user terminal 100 may be seated in the housing or may be positioned on the housing.

According to an embodiment, the user terminal 100 may further include a communication circuit for communicating with an external electronic device (e.g., the intelligence server 200). For example, the communication circuit may be positioned inside the housing and may be electronically connected to the processor 150.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100). For another example, the input module 110 may include a microphone capable of receiving user utterance as a voice signal. For example, the input module 110 may include a speech input system and may receive the utterance of the user as a voice signal through the speech input system.

According to an embodiment, the display 120 may display an image, a video, and/or an execution screen of an application. For example, the display 120 may display a graphic user interface (GUI) of an app.

According to an embodiment, the speaker 130 may output the voice signal. For example, the speaker 130 may output the voice signal generated in the user terminal 100 to the outside.

According to an embodiment, the memory 140 may store a plurality of apps 141 and 143. The plurality of apps 141 and 143 stored in the memory 140 may be selected, launched, and executed depending on the user input.

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 stored in the memory 140 may be loaded to operate. For example, the plurality of apps 141 and 143 stored in the memory 140 may be loaded by an execution manager module 153 of the processor 150 to operate. The plurality of apps 141 and 143 may include execution services **141*a* and 143*a* performing a function or a plurality of actions (or unit actions) 141*b* and 143*b*. The execution services 141*a* and 143*a* may be generated by the execution manager module 153 of the processor 150 and then may execute the plurality of actions 141*b* and 143*b*. For example, the plurality of apps 141 and 143 may be at least one of a gallery app, an image editing app, or a document editing app. According to an embodiment, a part of the plurality of apps 141 and 143 stored in the memory 140 may include at least one common function. For example, the second app 143** and the third app (not illustrated) may include one common function. For example, the common function may be messaging, emailing, or texting.

According to an embodiment, when the actions **141*b* and 143*b* of the apps 141 and 143 are executed, an execution state screen according to the execution of the actions 141*b* and 143*b* may be displayed in the display 120. For example, the execution state screen may be a screen in a state where the actions 141***b* and 143*b* are completed. For another example, the execution state screen may be a screen in a state where the execution of the actions 141*b* and 143*b* is in partial landing (e.g., when a parameter necessary for the actions 141*b* and 143*b* are not entered).

According to an embodiment, the execution services 141*a* and 143*a* may execute the actions 141*b* and 143*b* depending on a path rule. For example, the execution services 141*a* and 143*a* may be activated by the execution manager module 153, may receive an execution request from the execution manager module 153 depending on the path rule, and may execute the actions 141*b* and 143*b* of the apps 141 and 143 depending on the execution request. When the execution of the actions 141*b* and 143*b* is completed, the execution services 141*a* and 143*a* may transmit completion information to the execution manager module 153.

According to an embodiment, when the plurality of the actions 141*b* and 143*b* are respectively executed in the apps 141 and 143, the plurality of the actions 141*b* and 143*b* may be sequentially executed. When the execution of one action (action 1) is completed, the execution services 141*a* and 143*a* may open the next action (action 2) and may transmit completion information to the execution manager module 153. Here, it is understood that opening an arbitrary action is to change a state of the arbitrary action to an executable state or to prepare the execution of the arbitrary action. In other words, when the arbitrary action is not opened, the corresponding action may be not executed. When the completion information is received, the execution manager module 153 may transmit an execution request for the next actions 141*b* and 143*b* to an execution service (e.g., action 2). According to an embodiment, the plurality of apps 141 and 143 may be executed sequentially. For example, when receiving the completion information after the execution of the last action of the first app 141 is executed, the execution manager module 153 may transmit the execution request of the first action of the second app 143 to the execution service 143*a*.

According to an embodiment, when the plurality of the actions 141*b* and 143*b* are executed in the apps 141 and 143, a result screen according to the execution of each of the executed plurality of the actions 141*b* and 143*b* may be displayed in the display 120. According to an embodiment, only a part of a plurality of result screens according to the executed plurality of the actions 141*b* and 143*b* may be displayed in the display 120.

According to an embodiment, the memory 140 may store an intelligence app (e.g., a speech recognition app) operating in conjunction with an intelligence agent 151. The app operating in conjunction with the intelligence agent 151 may receive and process the utterance of the user as a voice signal. According to an embodiment, the app operating in conjunction with the intelligence agent 151 may be operated by a specific input (e.g., an input through a hardware key, an input through a touch screen, or a specific voice input) input through the input module 110.

According to an embodiment, the processor 150 may control overall operations of the user terminal 100. For example, the processor 150 may control the input module 110 to receive the user input. For example, the user input may include a request for performing a task using the user terminal 100. The processor 150 of the user terminal 100 may control the display 120 to display an image. The processor 150 may control the speaker 130 to output the voice signal. The processor 150 may control the memory 140 to read or store necessary information.

According to an embodiment, the processor 150 may include the intelligence agent 151, the execution manager module 153, or an intelligence service module 155. In an embodiment, the processor 150 may drive the intelligence agent 151, the execution manager module 153, or the intelligence service module 155 by executing instructions stored in the memory 140. Modules described in various embodiments of the disclosure may be implemented by hardware or by software. In various embodiments of the disclosure, it is understood that the action executed by the intelligence agent 151, the execution manager module 153, or the intelligence service module 155 is an action executed by the processor 150.

According to an embodiment, the intelligence agent 151 may generate an instruction for operating an app based on the voice signal received as the user input. According to an embodiment, the execution manager module 153 may receive the generated instruction from the intelligence agent 151, and may select, launch, and operate the apps 141 and 143 stored in the memory 140. According to an embodiment, the intelligence service module 155 may manage information of the user and may use the information of the user to process the user input.

The intelligence agent 151 may transmit and process the user input received through the input module 110 to the intelligence server 200.

According to an embodiment, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all the pre-processing elements for performance. However, in another embodiment, the intelligence agent 151 may include a part of the pre-processing elements to operate at low power.

According to an embodiment, the intelligence agent 151 may include a wake up recognition module recognizing a call of a user. The wake up recognition module may recognize a wake up instruction of the user through the speech recognition module. When the wake up recognition module receives the wake up instruction, the wake up recognition module may activate the intelligence agent 151 to receive the user input. According to an embodiment, the wake up recognition module of the intelligence agent 151 may be implemented with a low-power processor (e.g., a processor included in an audio codec). According to an embodiment, the intelligence agent 151 may be activated depending on the user input entered through a hardware key. When the intelligence agent 151 is activated, an intelligence app (e.g., a speech recognition app) operating in conjunction with the intelligence agent 151 may be executed.

According to an embodiment, the intelligence agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to an embodiment, the speech recognition module for executing the user input of the intelligence agent 151 may be implemented in an app processor.

According to an embodiment, the speech recognition module (including the speech recognition module of a wake up module) of the intelligence agent 151 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the intelligence agent 151 may change the voice input of the user to text data. According to an embodiment, the intelligence agent 151 may deliver the voice of the user to the intelligence server 200 to receive the changed text data. As such, the intelligence agent 151 may display the text data in the display 120.

According to an embodiment, the intelligence agent 151 may receive a path rule (or sequence) from the intelligence server 200. The path rule may include the states of the user terminal 100. For example, the intelligence agent 151 may receive a response including a path rule for performing a task from the intelligence server 200 and an identifier associated with the path rule. The identifier may be a unique ID (or a path rule ID) (e.g., a unique number) for distinguishing the related path rule from another path rule. For example, the identifier may be a unique ID for distinguishing path rules of a plurality of apps. Different path rules may be assigned to unique IDs (e.g., 001~099), respectively. According to an embodiment, the intelligence agent 151 may transmit the path rule to the execution manager module 153.

According to an embodiment, the intelligence agent 151 may transmit the execution result log according to the path rule received from the intelligence server 200 to the intelligence service module 155, and the transmitted execution result log may be accumulated and managed in preference information of the user of a persona module 155*b*.

According to an embodiment, the execution manager module 153 may receive the path rule from the intelligence agent 151 to execute the apps 141 and 143 and may allow the apps 141 and 143 to execute the actions 141*b* and 143*b* included in the path rule. In other words, the execution manager module 153 may perform a task by allowing the user terminal 100 to have the state of the path rule. For example, the execution manager module 153 may transmit instruction information for executing the actions 141*b* and 143*b* to the apps 141 and 143 and may receive completion information of the actions 141*b* and 143*b* from the apps 141 and 143.

According to an embodiment, the execution manager module 153 may transmit or receive the instruction information for executing the actions 141*b* and 143*b* of the apps 141 and 143 between the intelligence agent 151 and the apps 141 and 143. The execution manager module 153 may bind the apps 141 and 143 to be executed depending on the path rule and may transmit the instruction information of the actions 141*b* and 143*b* included in the path rule to the apps 141 and 143. For example, the execution manager module 153 may sequentially transmit the actions 141*b* and 143*b* included in the path rule to the apps 141 and 143 and may sequentially execute the actions 141*b* and 143*b* of the apps 141 and 143 depending on the path rule.

According to an embodiment, the execution manager module 153 may manage execution states of the actions 141*b* and 143*b* of the apps 141 and 143. For example, the execution manager module 153 may receive information about the execution states of the actions 141*b* and 143*b* from the apps 141 and 143. For example, when the execution states of the actions 141*b* and 143*b* are in stopped state (or partial landing) (e.g., when a parameter necessary for the actions 141*b* and 143*b* are not input), the execution manager module 153 may transmit information about the partial landing to the intelligence agent 151. The intelligence agent 151 may make a request for an input of necessary information (e.g., parameter information) to the user by using the received information. For another example, when the execution state of the actions 141*b* and 143*b* are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141*b* and 143*b* to a new parameter by using the received parameter information.

According to an embodiment, the execution manager module 153 may deliver the parameter information included in the path rule to the apps 141 and 143. When the plurality of apps 141 and 143 are sequentially executed depending on the path rule, the execution manager module 153 may deliver the parameter information included in the path rule from one app to another app.

According to an embodiment, the execution manager module 153 may receive a plurality of path rules. The execution manager module 153 may select a plurality of path rules based on the utterance of the user. For example, when the user utterance specifies the app 141 executing a part of the action 141*b* but does not specify the app 143 executing any other action 143*b*, the execution manager module 153 may receive a plurality of different path rules in which the same app 141 (e.g., an gallery app) executing the part of the action 141*b* is executed and in which different apps 143 (e.g., a message app or a Telegram app) executing the other action 143*b*. For example, the execution manager module 153 may execute the same actions 141*b* and 143*b* (e.g., the same successive actions 141*b* and 143*b*) of the plurality of path rules. When the execution manager module 153 executes the same action, the execution manager module 153 may display a state screen for selecting the different apps 141 and 143 included in the plurality of path rules in the display 120.

According to an embodiment, the intelligence service module 155 may include a context module 155*a*, a persona module 155*b*, or a suggestion module 155*c*.

The context module 155*a* may collect current states of the apps 141 and 143 from the apps 141 and 143. For example, the context module 155*a* may receive context information indicating the current states of the apps 141 and 143 to collect the current states of the apps 141 and 143.

The persona module 155*b* may manage personal information of the user utilizing the user terminal 100. For example, the persona module 155*b* may collect the usage information and the execution result of the user terminal 100 to manage personal information of the user.

The suggestion module 155*c* may predict the intent of the user to recommend an instruction to the user. For example, the suggestion module 155*c* may recommend an instruction to the user in consideration of the current state (e.g., a time, a place, context, or an app) of the user.

Figure 3:
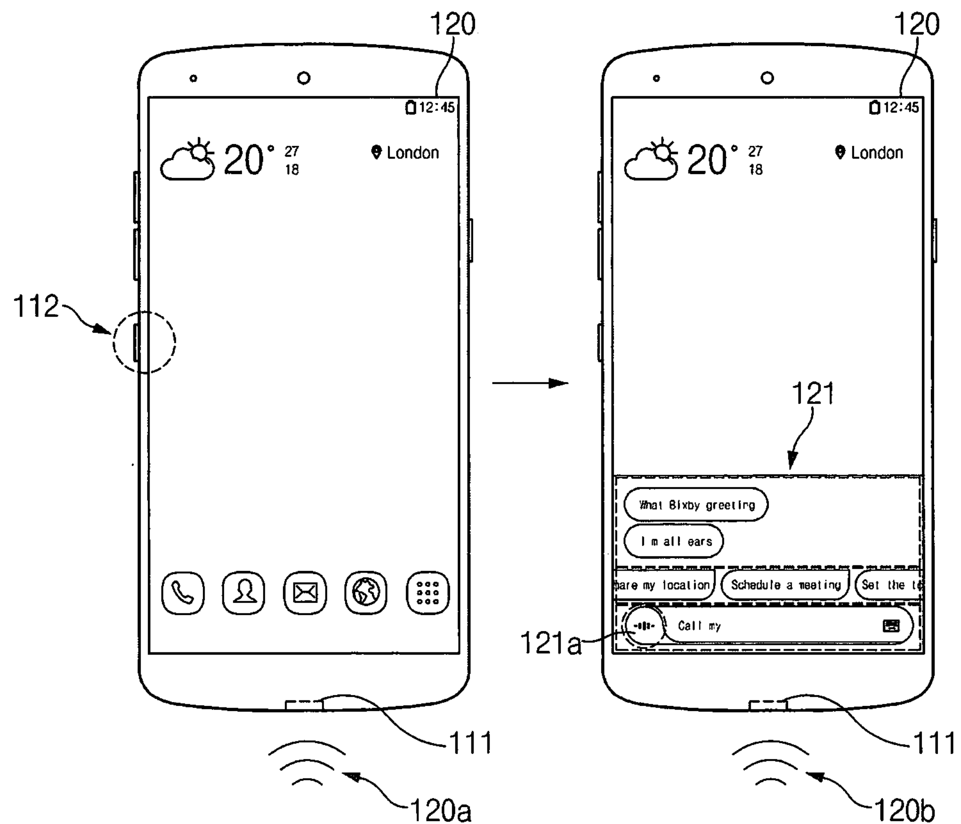
FIG. 3 is a view illustrating that an intelligence app of a user terminal is executed, according to an embodiment.

FIG. 3 is view illustrating that an intelligence app of a user terminal is executed, according to an embodiment.

FIG. 3 illustrates that the user terminal 100 receives a user input to execute an intelligence app (e.g., a speech recognition app) operating in conjunction with the intelligence agent 151.

According to an embodiment, the user terminal 100 may execute the intelligence app for recognizing a voice through a hardware key 112. For example, when the user terminal 100 receives the user input through the hardware key 112, the user terminal 100 may display a UI 121 of the intelligence app in the display 120. For example, a user may touch a speech recognition button 121*a* of the UI 121 of the intelligence app for the purpose of entering a voice 120*b* in a state where the UI 121 of the intelligence app is displayed in the display 120. For another example, while continuously pressing the hardware key 112 to enter the voice 120*b*, the user may enter the voice 120*b*.

According to an embodiment, the user terminal 100 may execute the intelligence app for recognizing a voice through the microphone. For example, when a specified voice (e.g., wake up!) is entered (120*a*) through a microphone 111, the user terminal 100 may display the UI 121 of the intelligence app in the display 120.

Figure 4:
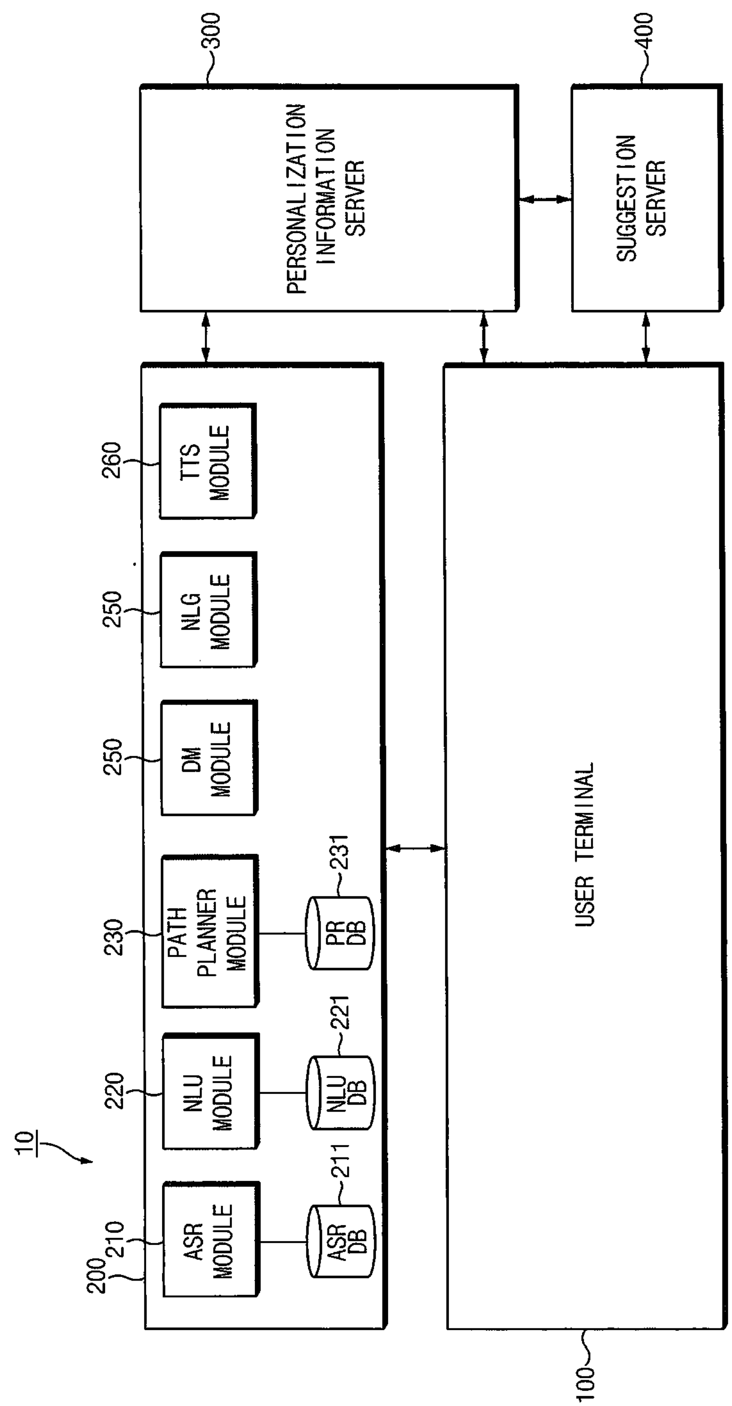
FIG. 4 is a block diagram illustrating an intelligence server of an integrated intelligence system, according to an embodiment.

FIG. 4 is a block diagram illustrating an intelligence server of an integrated intelligence system, according to an embodiment.

Referring to FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

According to an embodiment, the intelligence server 200 may include a communication interface, a memory, and a processor. The communication interface may communicate with an external electronic device (e.g., the user terminal 100) while being connected to the external electronic device. The memory may store data of the intelligence server 200. The processor may include the ASR module 210, the NLU module 220, the path planner module 230, the DM module 240, the NLG module 250, and the TTS module 260. In other words, the processor may perform the functions of the ASR module 210, the NLU module 220, the path planner module 230, the DM module 240, the NLG module 250, and the TTS module 260.

The NLU module 220 or the path planner module 230 of the intelligence server 200 may generate a path rule.

According to an embodiment, the ASR module 210 may change the user input received from the user terminal 100 to text data.

According to an embodiment, the ASR module 210 may include an utterance recognition module. The utterance recognition module may include an acoustic model and a language model. For example, the acoustic model may include information associated with utterance, and the language model may include unit phoneme information and information about a combination of unit phoneme information. The utterance recognition module may change user utterance to text data by using the information associated with utterance and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words that are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. The NLU module 220 may generate a path rule ID (or identifier) associated with the generated path rule. The NLU module 220 may tag the generated path rule ID with the generated path rule. Accordingly, the path rule generated by the NLU module 220 may include information about the app to be executed, the action to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, when only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 at a request according to the user input. For example, the NLU module 220 may transmit one path rule corresponding to the user input to the user terminal 100. For another example, the NLU module 220 may transmit the plurality of path rules corresponding to the user input to the user terminal 100. For example, when only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may deliver a path rule set including the plurality of path rules to the NLU module 220. The plurality of path rules of the path rule set may be stored in the PR DB 231 connected to the path planner module 230 in the table form. For example, the path planner module 230 may deliver a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to an embodiment, the path planner module 230 may select one path rule or the plurality of path rules from the path rule set to deliver the selected one path rule or the selected plurality of path rules to the NLU module 220. For example, the path planner module 230 may match the user intent and the parameter to the path rule set corresponding to the user terminal 100 to select one path rule or a plurality of path rules and may deliver the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to an embodiment, when the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. When the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the natural language generating module NLG 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130.

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
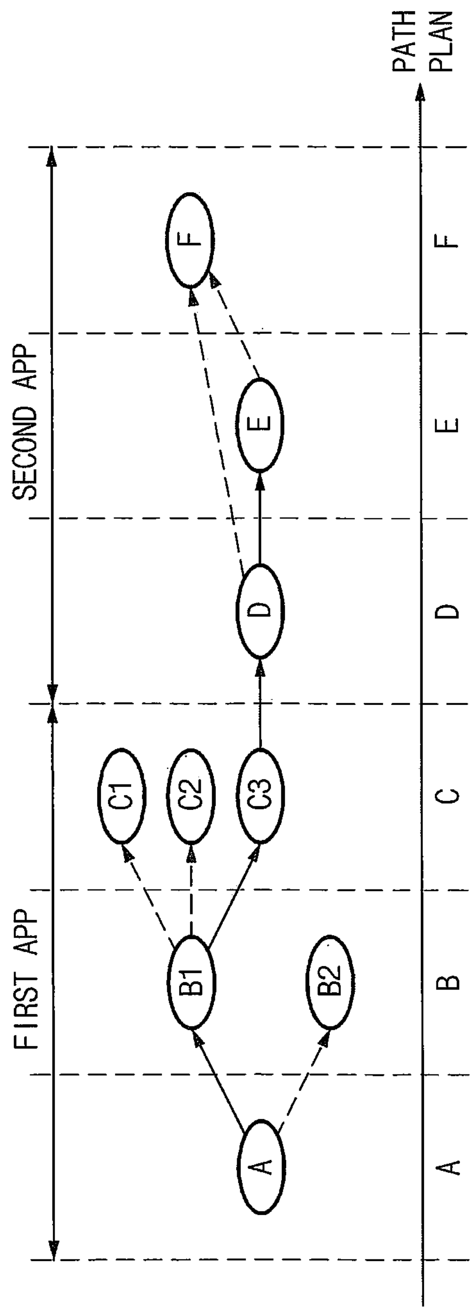
FIG. 5 is a view illustrating a path rule generating method of a natural language understanding (NLU) module, according to an embodiment of the disclosure.

FIG. 5 is a diagram illustrating a path rule generating method of an NLU module, according to an embodiment.

Referring to FIG. 5, according to an embodiment, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F divided into unit actions, in the PR DB 231.

According to an embodiment, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, when there is no path rule completely matched to the user input, the NLU module 220 may deliver a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may deliver the one or more path rules to the user terminal 100.

According to an embodiment, the NLU module 220 may select one of a plurality of path rules based on an input added by the user terminal 100 and may deliver the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, when a user input in which information is insufficient is received by the intelligence server 200, the NLU module 220 may generate a path rule partly corresponding to the received user input. For example, the NLU module 220 may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for an additional input to a user by using the information about the insufficient parameter. When the additional input is received by the user, the intelligence agent 151 may transmit and process the additional input to the intelligence server 200. The NLU module 220 may generate a path rule to be added, based on the intent of the user input additionally entered and parameter information and may transmit the path rule to be added, to the intelligence agent 151. The intelligence agent 151 may transmit the path rule to the execution manager module 153 and may execute the second app 143.

According to an embodiment, when a user input, in which a portion of information is missing, is received by the intelligence server 200, the NLU module 220 may transmit a user information request to the personalization information server 300. The personalization information server 300 may transmit information of a user entering the user input stored in a persona database to the NLU module 220. The NLU module 220 may select a path rule corresponding to the user input in which a part of an action is missing, by using the user information. As such, even though the user input in which a portion of information is missing is received by the intelligence server 200, the NLU module 220 may make a request for the missing information to receive an additional input or may determine a path rule corresponding to the user input by using user information.

Figure 6:
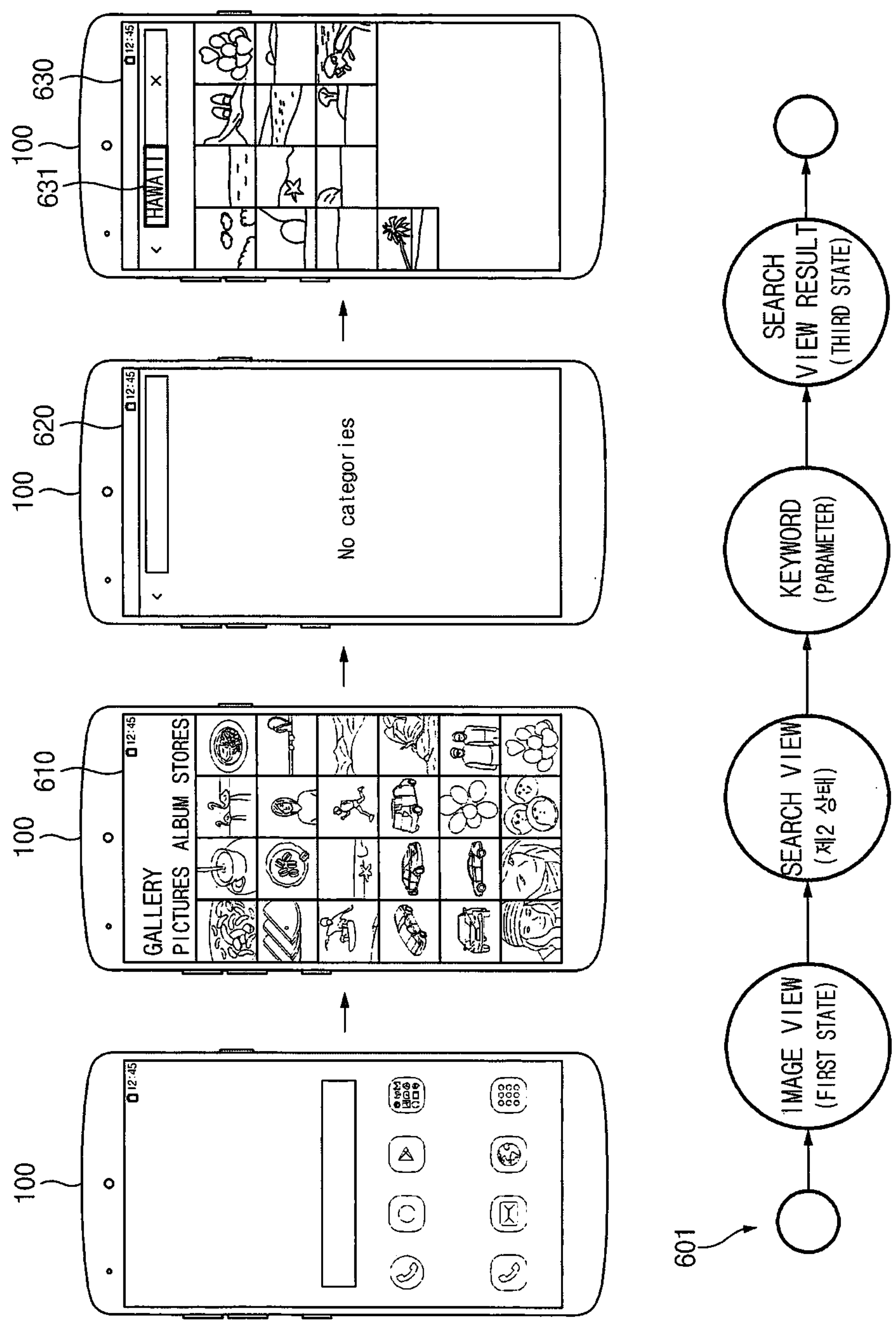
FIG. 6 is a view illustrating a conceptual diagram of a path rule generated by an intelligence server, according to an embodiment.

FIG. 6 is a view illustrating a conceptual diagram of a path rule generated by an intelligence server, according to an embodiment.

Referring to FIG. 6, the intelligence server 200 may generate a path rule 601 corresponding to the user input received from the user terminal 100.

According to an embodiment, the intelligence server 200 may generate the path rule 601 including information about the action for performing the function of an app. For example, the intelligence server 200 may generate the path rule 601 including information about the action of the app and a parameter (or keyword) necessary for the action of the app. For example, the information about the action of the app may include information about the state of the user terminal 100. According to an embodiment, the intelligence server 200 may generate a path rule including information about a plurality of actions of the app. For example, the path rule may include information in which the plurality of actions of the app are arranged sequentially. As such, the intelligence server 200 may generate a path rule in which the plurality of states of the user terminal 100 and parameters (e.g., parameters entered such that the parameters are changed to a specified state) necessary for actions corresponding to the plurality of states are arranged sequentially.

According to an embodiment, the intelligence server 200 may receive data corresponding to a user utterance from the user terminal 100. For example, the intelligence server 200 may receive data corresponding to “find a Hawaii photo.” from the user terminal 100. The intelligence server 200 (e.g., the NLU module 220) may generate the path rule 601 corresponding to a user input saying that “find a Hawaii photo”. For example, the path rule may include information in which an image view (first state), a search view (second state), a parameter (e.g., Hawaii) entered in the search view (second state), and a search view result (third state) are arranged sequentially.

According to an embodiment, the user terminal 100 may execute the action of the app depending on the path rule and may display the screen according to the executed operation, on the display 120. For example, the user terminal 100 may execute a gallery app corresponding to each state included in the path rule to sequentially display an image view screen 610, a search view screen 620 for searching for an image, and a search view result screen 630 for providing the result found by entering 'Hawaii 631', on the display 120.

Figure 7:
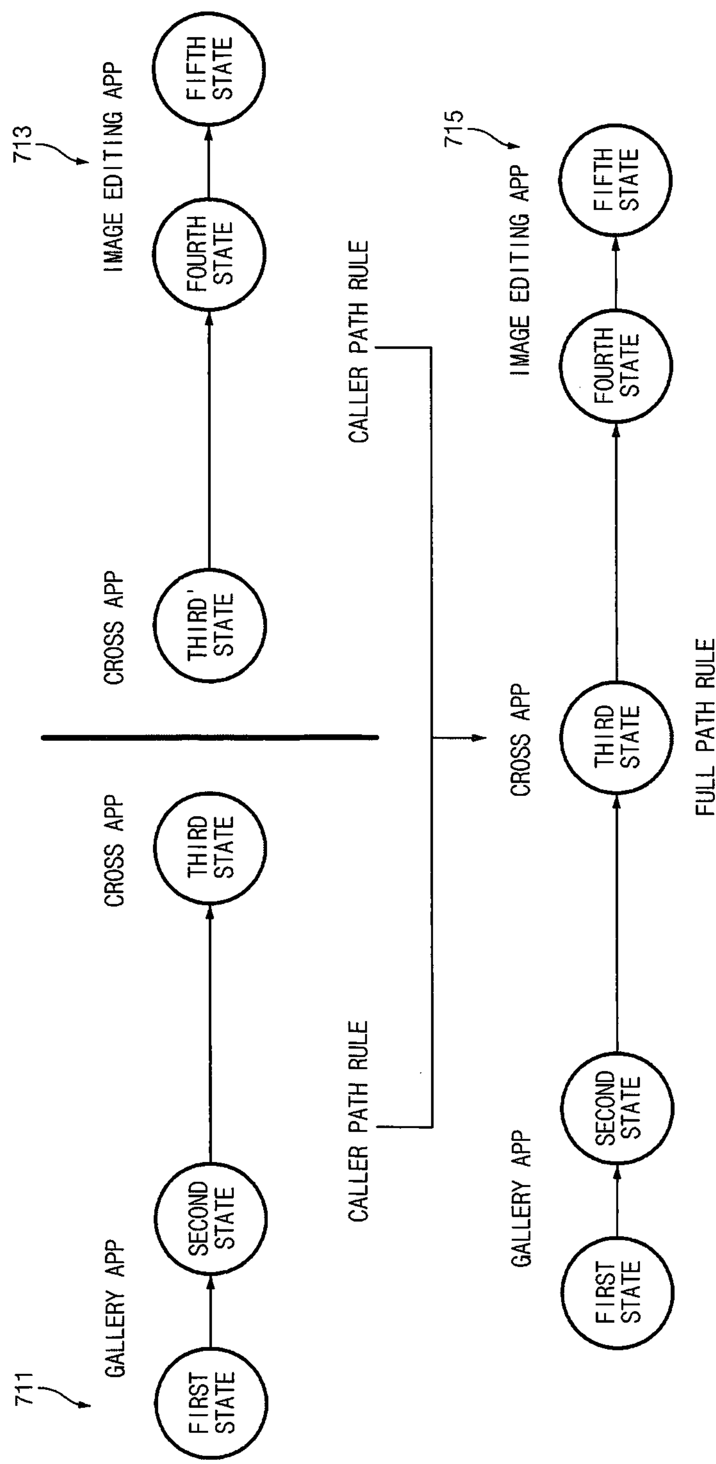
FIGS. 7, 8, and 9 are views illustrating that an intelligence server generates a path rule corresponding to a user input by using a plurality of path rules, according to an embodiment.
Figure 8:
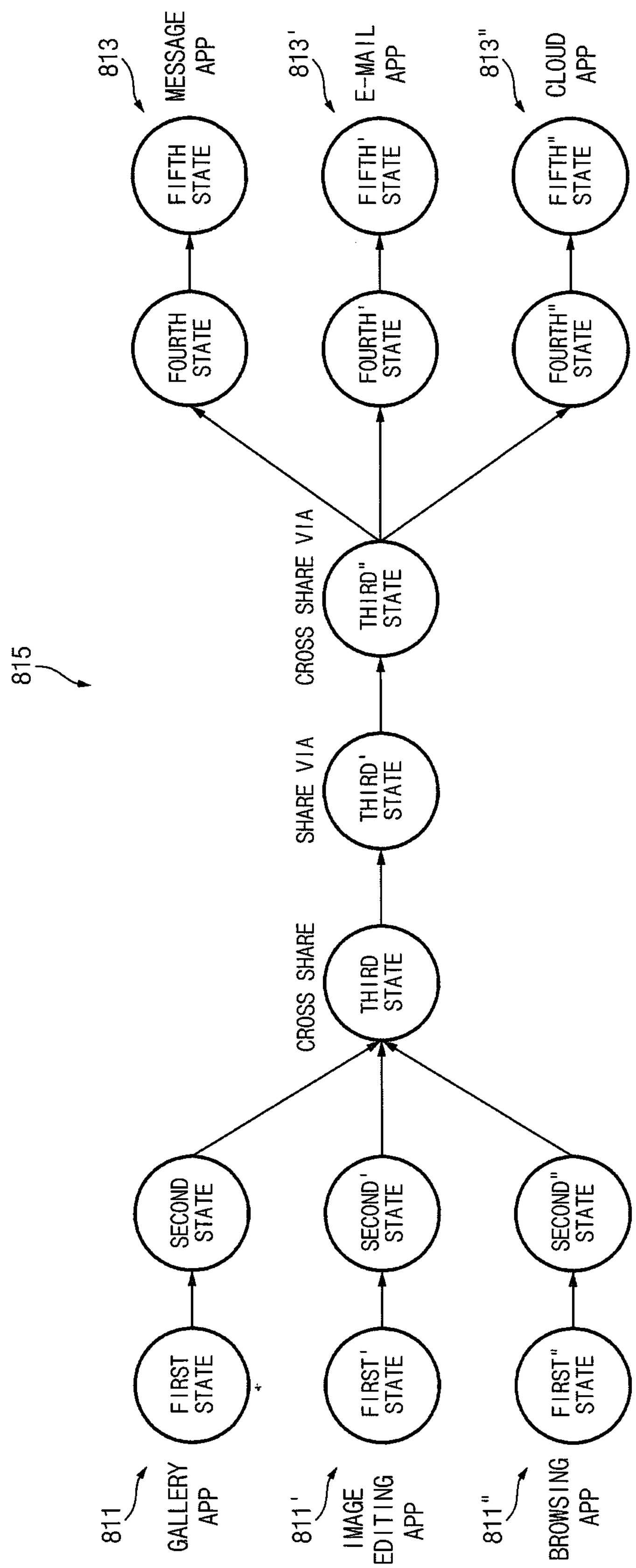
Figure 9:
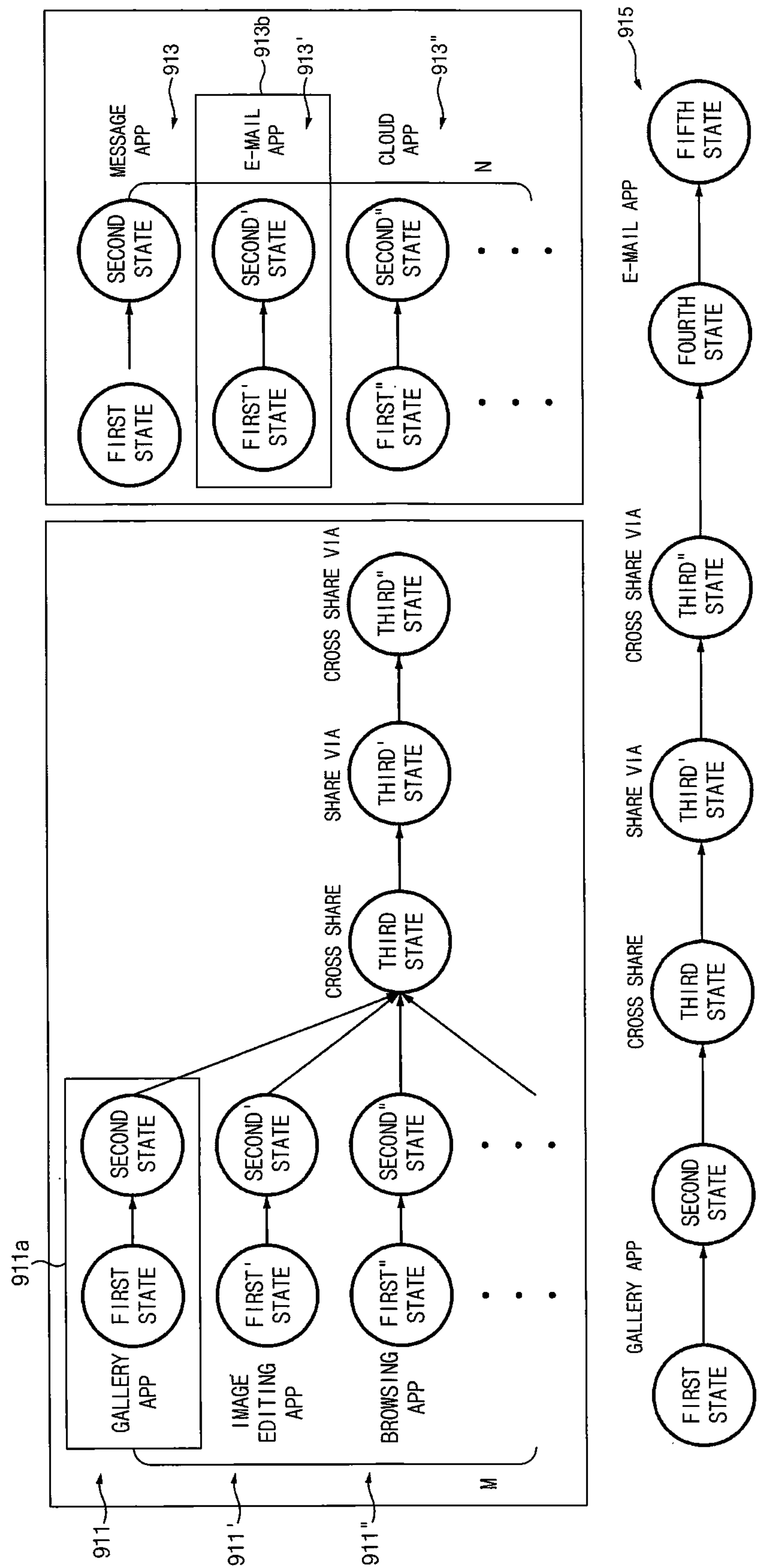

FIGS. 7, 8, and 9 are views illustrating that an intelligence server generates a path rule corresponding to a user input by using a plurality of path rules, according to an embodiment.

Referring to FIGS. 7, 8, and 9C, the intelligence server 200 (e.g., the NLU module 220) may generate a path rule corresponding to a user input (e.g., user utterance), using the path rule of the app stored in a database (e.g., the PR DB 231). For example, the intelligence server 200 may select the path rule of the app based on the intent of the user input and a parameter and then may generate a path rule (or full path rule) corresponding to the user input, using the path rule (or partial path rule) of the selected app.

According to an embodiment, the intelligence server 200 (e.g., the path planner module 230) may store the path rule of each app in the database (e.g., the PR DB 231). The intelligence server 200 may distinguish and store the path rule of the app depending on the nature of the path rule.

According to an embodiment, the intelligence server 200 may distinguish the path rule of the app based on whether another path rule is capable of being arranged before or after the path rule of the app, and then may store the distinguished result in the database. For example, the intelligence server 200 may classify the path rule of the app into a normal path rule, a caller path rule, and a callee path rule and then may store the classified result in the database. The normal path rule may be a path rule in which another path rule is not capable of being arranged before and after the normal path rule. The caller path rule caller may be a path rule in which the path rule of another app is capable of being arranged after the path rule. The callee path rule may be a path rule in which the path rule of another app is capable of being arranged before the path rule. When a user input is, for example, "send a Hawaii photo to Mom through a message.", a path rule for selecting a Hawaii image in a gallery app may be the caller path rule, and a path rule for sending the image to Mom in a message app may be the callee path rule. Furthermore, the intelligence server 200 may distinguish the caller/callee path rule, in which the path rule of the app is capable of arranging the path rule of another app before and after the path rule, and then may store the distinguished result in the database.

According to an embodiment, the intelligence server 200 (e.g., the path planner module 230) may distinguish the path rule of the app based on whether it is sufficient to execute the action depending on the path rule of an app and then may store the distinguished result in the database. For example, the intelligence server 200 may classify the caller path rule and the callee path rule into a static path rule (e.g., a static caller path rule and a static callee path rule static) or a dynamic path rule (e.g., a dynamic caller path rule and a dynamic callee path rule) and then may store the classified result in the database. The static caller path rule and the static callee path rule may be path rules sufficient to perform the action of the app depending on the user input. When a user input is, for example, "send a Hawaii photo to Mom through a message.", a path rule for selecting a Hawaii image in a gallery app may be the static caller path rule, and a path rule for sending the edited image in a message app may be the static callee path rule. The dynamic caller path rule and the dynamic callee path rule may be path rules insufficient to perform the action of the app depending on the user input. For example, when the user input is "share a Hawaii photo with Mom", a path rule that selects a Hawaii image in a gallery app and then shares the selected image in an image editing app may be the dynamic caller path rule. Because the user input has insufficient information about which app will share the image, a path rule for sending the edited image may be positioned through one app among a plurality of apps (e.g., a message app and an e-mail app) in the dynamic caller path rule. In addition, when the user input is "sending it to Mom through a message", sending the message to Mom in a message app may be the dynamic callee path rule. Because the user input has insufficient information about which app will send the obtained information via the message, a path rule for obtaining information in one app among a plurality of apps (e.g., a gallery app and an image editing app) in the dynamic callee path rule. In other words, in the dynamic path rule, each of a plurality of path rules may be positioned before or after the path rule. Furthermore, the intelligence server 200 may distinguish a static callee/static caller path rule, a static callee/dynamic caller path rule, a dynamic callee/static caller path rule, and a dynamic callee/caller path rule, which are capable of arranging the path rule of another app before and after the caller path rule and the callee path rule, and then may store the distinguished result in the database.

According to an embodiment, the intelligence server 200 (e.g., the NLU module 220) may generate a path rule by combining (or arranging) the path rules of an app stored in the database.

Referring to FIG. 7, the intelligence server 200 (e.g., the NLU module 220) may generate a full path rule 715 corresponding to the user input, using the combination of path rules. For example, the intelligence server 200 may generate the full path rule 715 corresponding to the user input, using a static combination method of combining a static caller rule 711 and a static callee rule 713. The static caller path rule 711 and the static callee path rule 713 may be path rules sufficient to perform the action of the app according to the user input. For example, when the user input is "edit a Hawaii photo", the path rule for selecting the Hawaii image in a gallery app may be a static caller path rule 911, and the path rule for sending the edited image in the image editing app may be a static callee path rule 913. The image editing app may be the only app that performs an image editing function in the user terminal 100. The static caller path rule 711 and the static callee path rule 713 may include information about actions of different apps (e.g., a gallery app and an image editing app).

According to an embodiment, the intelligence server 200 may separately select the static caller path rule 711 and the static callee path rule 713 that correspond to the user input. For example, the intelligence server 200 may generate a path rule, using the static caller path rule 711 and the static callee path rule 713 that include information about actions of different apps (e.g., a gallery app and an image editing app). For example, the static caller path rule 711 may include includes the first state and the second state of the first app (e.g., a gallery app) and may include a third state (or a cross app) for calling a specified app (or a targeted app) (e.g., a second app). The third state may include a first state ID (e.g., CROSS_photoedit_home) for calling the specified app (or the second app). The static caller path rule 713 may include a third' state (or a cross app) for calling the second app (e.g., an image editing app) and may include a fourth state and a fifth state of the second app. The third' state may include a second state ID (e.g., CROSS_photoedit_home) for calling the second app. The first state ID and the second state ID may be similar to each other.

According to an embodiment, the intelligence server 200 may generate the full path rule 715, using the static caller path rule 711 and the static callee path rule 713 that include state IDs corresponding to each other. For example, the intelligence server 200 may combine a static caller path rule and a static callee path rule, using a tool (e.g., software tool) for combining a caller path rule and a callee path rule. The intelligence server 200 may call the specified app (or the second app) without going through the chooser that receives a user input to select the app to be called. For example, the full path rule 715 may include the first state and the second state of the first app, the third state for calling the second app (or the cross app), and the fourth state and the fifth state of the second app.

According to an embodiment, the intelligence server 200 may store the generated full path rule 915 in the database (e.g., the PR DB 231). In other words, the intelligence server 200 may train the generated the full path rule 715. According to an embodiment, the intelligence server 200 may generate a path rule corresponding to the user input received from the user terminal 100, using the path rule (or the full path rule 715) stored in the database.

Referring to FIG. 8, the intelligence server 200 (e.g., the NLU module 220) may generate a full path rule 815 corresponding to the user input, using the combination of path rules. For example, the intelligence server 200 may generate the full path rule 815 corresponding to the user input, using a dynamic combination method of combining caller rules 811, 811', and 811" and callee rules 813, 813', and 813". The dynamic caller path rules 811, 811', and 811" and the dynamic callee path rules 813, 813', and 813" may be path rules insufficient to perform the action of the app depending on the user input. For example, when the user input is “share a Hawaii photo with Mom”, a path rule that selects a Hawaii image in a gallery app and then shares the selected image in an image editing app may be a dynamic caller path rule. In addition, when the user input is “sending it to Mom through a message”, sending the message to Mom in a message app may be the dynamic callee path rule. The dynamic caller path rules 811, 811', and 811" and the dynamic callee path rules 813, 813', and 813" may include information about the actions of different apps.

According to an embodiment, the intelligence server 200 may select the dynamic caller path rules 811, 811', and 811" corresponding to the user input. For example, the first dynamic caller path rule 811 may include includes the first state and second state of the first app (e.g., a gallery app), and may include a third state (or a cross share) for calling a specified app (or a targeted app). The second dynamic caller path rule 811' may include the first' state, the second' state, and the third state of a second app (e.g., an image editing app). The third dynamic caller path rule 811" may include the first state, the second state, and the third state of a third app (e.g., a browsing app). The third state may include a first state ID (e.g., CROSS_share) for calling an app selected depending on the user input. The specified app may be an app (or a fourth app, a fifth app, or a sixth app) capable of being selected depending on the user input.

According to an embodiment, the intelligence server 200 may select the dynamic callee path rules 813, 813', and 813" corresponding to the user input. For example, the first dynamic callee path rule 813 may include a third" state (or cross share via) for calling the app (or a fourth app, a fifth app, or a sixth app) selected depending on the user input and may include the fourth state and the fifth state of the fourth app (e.g., message app) capable of being selected depending on the user input. The second dynamic callee path rule 813' may include the third" state and may include the fourth' state and the fifth' state of the fifth app (e.g., an e-mail app) capable of being selected depending on the user input. The third dynamic callee path rule 813" may include the third" state and may include the fourth" state and the fifth" state of the sixth app (e.g., a cloud app) capable of being selected depending on the user input. The third" state may include a second state ID (e.g., CROSS_sharevia) for being called from a specified app (or the first app, the second app, or the third app). The specified app may be an app (e.g., the first app, the second app, or the third app) specified by the second state ID. The intelligence server 200 may receive a user input to select an app to be called through the chooser, and may generate the dynamic caller path rule 813, 813', or 813" corresponding to an app (the fourth app, the fifth app, or the sixth app) selected depending on the user input.

According to an embodiment, the intelligence server 200 may generate the full path rule 815 in all cases capable of being generated depending on the user input, using the dynamic caller path rules 811, 811', and 811" and the dynamic callee path rules 813, 813', and 813". According to an embodiment, the intelligence server 200 may combine a dynamic callee path rule and a static callee path rule, using a tool for combining a caller path rule and a callee path rule. For the purpose of combing the dynamic callee path rule and the static callee path rule, the tool may interpose a third state ID (e.g., share via) between the dynamic callee path rule and the static callee path rule. For example, the full path rule 815 may include the state of any app selected among the first state and the second state of the first app, the first' state and the second' state of the second app, and the first" state and the second" state of the third app. The full path rule 815 may further include the third state, the third' state, and the third" state for calling (or cross share) an app capable of selecting the state of the selected app depending on a user input. Furthermore, the full path rule 815 may further include the state of any app selected among the fourth state and the fifth state of the fourth app, the fourth' state and the fifth' state of the fifth app, and the fourth" state and the fifth" state of the sixth app.

According to an embodiment, the intelligence server 200 may store the generated full path rule 815 in the database (e.g., the PR DB 231). In other words, the intelligence server 200 may train the generated the full path rule 815. According to an embodiment, the intelligence server 200 may generate a path rule corresponding to the user input received from the user terminal 100 by using the path rule (or the full path rule 815) stored in the database.

As such, the intelligence server 200 may generate various path rules (or the full path rule) by combining path rules (e.g., a caller path rule and a callee path rule) corresponding to functions of each of apps of the user terminal 100 and may generate a path rule corresponding to the user input, using the various path rules.

Referring to FIG. 9, the intelligence server 200 (e.g., the NLU module 220 and the path planner module 230) may generate the full path rule 915 corresponding to a user input, using the combination of path rules. The intelligence server 200 may separately generate the dynamic caller path rule 921 and the dynamic callee path rule 923.

According to an embodiment, the intelligence server 200 (e.g., the NLU module 220) may select the dynamic caller path rules 911, 911', and 911" corresponding to the user input. For example, the intelligence server 200 may generate the dynamic caller path rules 911, 911', and 911" respectively corresponding to a first app (e.g., a gallery app), a second app (e.g., an image editing app), and a third app (e.g., a browsing app). The dynamic caller path rules 911, 911', and 911" may be similar to the dynamic caller path rules 811, 811', and 811" of FIG. 8. Furthermore, the intelligence server 200 may generate a dynamic caller path rule corresponding to 'M' apps including the first app, the second app, and the third app.

According to an embodiment, the intelligence server 200 (e.g., the NLU module 220) may select the dynamic callee path rules 913, 913', and 913" corresponding to the user input. For example, the intelligence server 200 may generate the dynamic callee path rules 913, 913', and 913" respectively corresponding to a fourth app (e.g., a message app), a fifth app (e.g., an e-mail app), and a sixth app (e.g., a cloud app). The dynamic callee path rules 913, 913', and 913" may be similar to the dynamic callee path rules 813, 813', and 813" of FIG. 8. Furthermore, the intelligence server 200 may generate a dynamic callee path rule corresponding to 'N' apps including the fourth app, the fifth app, and the sixth app. For another example, even in the case of the same app, the intelligence server 200 may generate a dynamic callee path rule corresponding to the state of another version.

According to an embodiment, the intelligence server 200 may store the generated dynamic caller path rules 911, 911', and 911" and the generated dynamic callee path rules 913, 913', and 913" in the database (e.g., the PR DB 231). In other words, the intelligence server 200 may train the generated dynamic caller path rules 911, 911', and 911" and the dynamic callee path rules 913, 913', and 913". For example, the intelligence server 200 may store the dynamic caller path rules 911, 911', and 911" and the dynamic callee path rules 913, 913', and 913", which include information about a parameter (e.g., search words and recipients) necessary for the action of an app, in the database.

According to an embodiment, the intelligence server 200 may generate a path rule corresponding to the user input received from the user terminal 100, using path rules (or the dynamic caller path rules 911, 911', and 911" and the dynamic callee path rules 913, 913', and 913") stored in the database. For example, the intelligence server 200 (e.g., the NLU module 220) may select a dynamic caller path rule **911*a* corresponding to a user input. The intelligence server 200 (e.g., the path planner module 230) may select a dynamic callee path rule 913*a* corresponding to user input. The selected dynamic caller path rule 911*a* and the selected dynamic callee path rule 913*a* may be path rules capable of being processed by the user terminal 100. For example, the path rule capable of being processed by the user terminal 100 may include information about the action of an app, the version of which is the same as the version of an app of the user terminal 100. As such, the intelligence server 200 may combine the selected dynamic caller path rule 911*a* and the selected dynamic callee path rule 913*a* in real time (or runtime) to generate the full path rule 915. In other words, the full path rule 915** may include the path rule corresponding to the first path rule ID and the path rule corresponding to the second path rule ID.

According to an embodiment, the intelligence server 200 may combine path rules (e.g., a caller path rule and a callee path rule) corresponding to the functions of an app to generate a path rule (or a full path rule) corresponding to a user input, and thus the intelligence server 200 may store fewer path rules in the database, as compared with generating the path rule corresponding to the user input, using a path rule (or the full path rule) indicating the action of end-to-end generated in advance. In other words, when the number of caller path rules and the number of callee path rules respectively are 'M' and 'N', in the case where the intelligence server 200 stores a full path rule, the intelligence server 200 may store path rules of "M*N*the number of versions" in the database. However, when combining path rules to generate the full path rule, the intelligence server 200 may store only the path rules of "(M+N)*the number of versions", in the database. Accordingly, compared with fewer path rules when a path rule corresponding to a user input is selected, the intelligence server 200 (e.g., the NLU module 220) may rapidly generate a path rule; and the entire path rules of the population to be selected will be reduced; the probability that a path rule with an error is selected may be low because the number of similar path rules may be relatively low.

According to an embodiment, the NLU module 220 of the intelligence server 200 may determine the dynamic caller path rule. The NLU module 220 may determine the dynamic caller path rule by grasping the intent of a user input. According to an embodiment, the path planner module 230 of the intelligence server 200 may determine the dynamic callee path rule. The path planner module 230 may determine the dynamic callee path rule, using parameter information included in the user input transmitted from the NLU module 220. Accordingly, the NLU module 220 may not recognize the parameter necessary for the dynamic callee path rule.

According to an embodiment, when executing the action of an app depending on the path rule received from the intelligence server 200, the user terminal 100 may perform partial landing. The user terminal 100 may perform partial landing in the state included in the dynamic callee path rule. For example, the state included in the dynamic callee path rule may not include a parameter for executing an action corresponding to the state. Accordingly, the user terminal 100 may receive an additional utterance from a user to fill the parameter.

For example, when receiving a user input saying that "send a Hawaii photo to Mom through a message", the user terminal 100 may not include the parameter necessary for an action of sending the message corresponding to the dynamic callee path rule among path rules corresponding to the user input. Accordingly, the user terminal 100 may receive a parameter (e.g., Mom and a Hawaii photo) for sending the message, through a follow-up utterance.

According to another embodiment, when generating the path rule corresponding to a user input, the NLU module 220 of the intelligence server 200 may generate information about a parameter (or standard parameter). For example, the information about the parameter may include appname, recipients, and content. The appname may include information about the appname called depending on the dynamic callee path rule. The recipients may include information about a person who receives the content depending on the dynamic callee path rule. The content may include information (e.g., the body of a message or an e-mail) to be delivered depending on the dynamic callee path rule. According to an embodiment, the NLU module 220 of the intelligence server 200 may deliver the parameter necessary for a dynamic callee path rule to the path planner module 230, using the information about the parameter. The path planner module 230 may determine the dynamic callee path rule, using a part of information about the parameter and may determine the parameter necessary for the dynamic callee path rule, using the remaining information.

For example, when receiving a user input saying that "send a Hawaii photo to Mom through a message", the NLU module 220 of the user terminal 100 may deliver "message" (appname), "Hawaii photos" (content), and "Mom" (recipients) to the path planner module 230, in an action of selecting the Hawaii photo. The path planner module 230 may select a dynamic callee path rule by recognizing the appname and then may use the content and the recipients as parameters of the selected path rule.

According to an embodiment, the user terminal 100 may generate a path rule corresponding to a user input by combining a static path rule and a dynamic path rule. For example, the user terminal 100 may generate the path rule corresponding to the user input by combining each of a plurality of static callee path rules with a dynamic caller path rule. For another example, the user terminal 100 may generate the path rule corresponding to the user input by combining a plurality of static caller path rules with a dynamic callee path rule.

Figure 10:
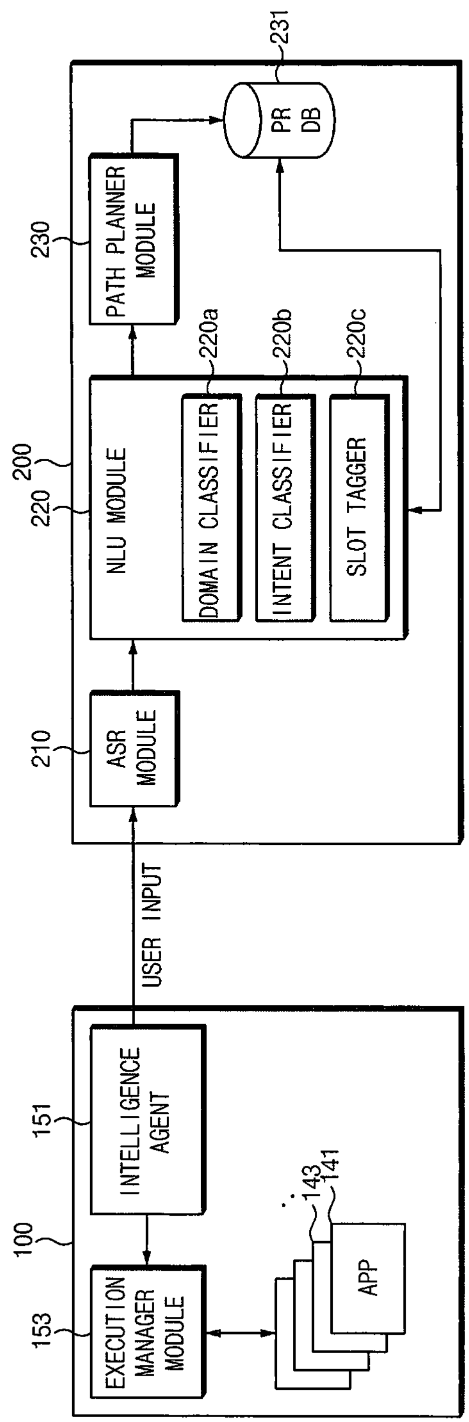
FIG. 10 is a view illustrating that an intelligence server generates a path rule corresponding to a user input by combining a dynamic path rule, according to an embodiment.

FIG. 10 is a view illustrating that an intelligence server generates a path rule corresponding to a user input by combining a dynamic path rule, according to an embodiment.

Referring to FIG. 10, the intelligence server 200 may select a dynamic caller path rule and a dynamic callee path rule and may generate a path rule corresponding to a user input (e.g., a user utterance) received from the user terminal 100 in combination with the selected dynamic path rules.

According to an embodiment, the user terminal 100 (e.g., the intelligence agent 151) may transmit the received user utterance to the intelligence server 200. The user terminal 100 may receive a user input including a request for performing a task, using a first app and a second app and then may transmit the user input to the intelligence server 200. For example, the user terminal 100 may receive a user input saying that "share the photo captured in Hawaii with Mom through a message!" and then may transmit the user input to the intelligence server 200.

According to an embodiment, the ASR module 210 may convert the user input into text data to transmit the converted text data to the NLU module 220. According to an embodiment, the NLU module 220 may select a first path rule (or a dynamic caller path rule) corresponding to the user input through a domain classifier 220*a* and an intent classifier 220*b*. The NLU module 220 may determine an app, which will execute an action corresponding to the user input, through the domain classifier 220*a*. In other words, the domain classifier 220*a* may select a domain associated with an app, based on the received user input. The NLU module 220 may determine a path rule corresponding to the intent of the user input, through the intent classifier 220*b*. In other words, the intent classifier 220*b* may select the first path rule, based on the user input. The NLU module 220 may obtain a parameter necessary for an action corresponding to the user input, through a slot tagger 220*c*. The slot tagger 220*c* may tag the obtained parameter with a path rule. For example, the NLU module 220 may select the first path rule that searches for a Hawaii image in a gallery app and then selects the found image. For example, the first path rule may include a share via state. In addition, the NLU module 220 may obtain a parameter including a Hawaii image $P_1$, a Mom $P_2$, and a message $P_3$. According to an embodiment, the NLU module 220 may select the second path rule corresponding to the user input with reference to the path rule of an app stored in a database (e.g., the PR DB 231).

According to an embodiment, the path planner module 230 may receive information about the parameter and then may select the second path rule (or a dynamic callee path rule) corresponding to the user input. For example, the path planner module 230 may select the second path rule of sending a Hawaii image to Mom in a message app, using the parameter information. According to an embodiment, the path planner module 230 may select the first path rule corresponding to the user input with reference to the path rule of an app stored in the database (e.g., the PR DB 231). According to an embodiment, the path planner module 230 may generate a third path rule (or a full path rule) corresponding to the user input by combining the first path rule and the second path rule. In other words, the path planner module 230 may combine the first path rule and the second path rule. According to an embodiment, the path planner module 230 may transmit the third path rule (or the combination) to the user terminal 100.

According to an embodiment, the user terminal 100 (e.g., the execution manager module 153) may execute actions of the apps 141 and 143 depending on the third path rule. The user terminal 100 may receive a response including information about a path rule and a path rule ID corresponding to the path rule, from the intelligence server 200. The path rule ID may be the combination of a first path rule ID associated with a first app and a second path rule ID associated with the second app. The user terminal 100 may perform a task corresponding to a user input by having a state included in the path rule. In other words, the combination may be a third path rule ID generated based on the first path rule ID and the second path rule ID. The user terminal 100 may recognize the third path rule ID such that the user terminal 100 has the states of the path rule, and thus may perform the task corresponding to the user input.

According to an embodiment, even though receiving a user input corresponding to the app newly added (or updated) to the database, the intelligence server 200 may generate a path rule (or a full path rule) corresponding to the user input. For example, even though receiving a user input saying that "share a Hawaii photo with Mom through Dropbox", the intelligence server 200 may select the fourth path rule (or the updated dynamic callee rule), using information (e.g., Hawaii image $P_1'$, Mom $P_2'$, and Dropbox $P_3'$) about a parameter and may generate the fifth path rule (or a new full path rule) in combination with the first path rule.

As such, when only the path rule for the newly added app is added to the database, the intelligence server 200 may process a user input including the action (or state) of the newly added app.

Figure 11A:
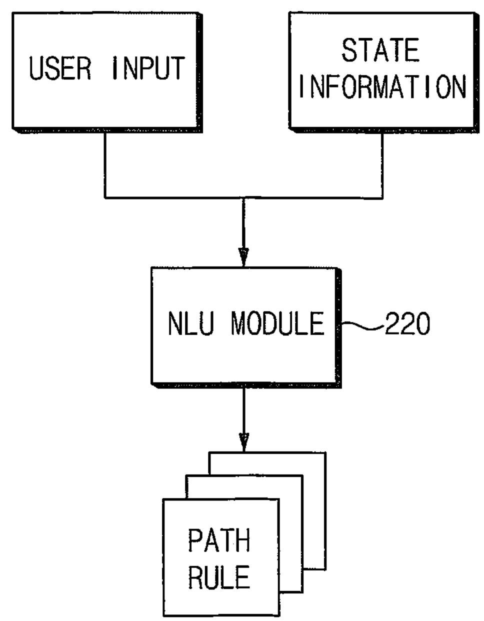
FIGS. 11A, 11B, and 11C are views illustrating that an intelligence server generates a path rule corresponding to a user input by using state information of a user terminal, according to an embodiment.
Figure 11B:
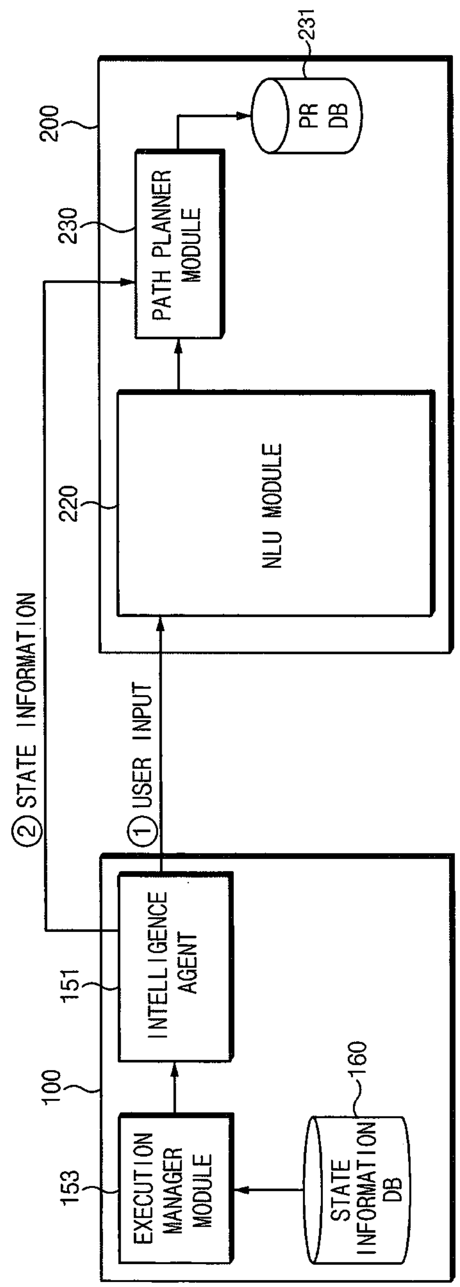
Figure 11C:
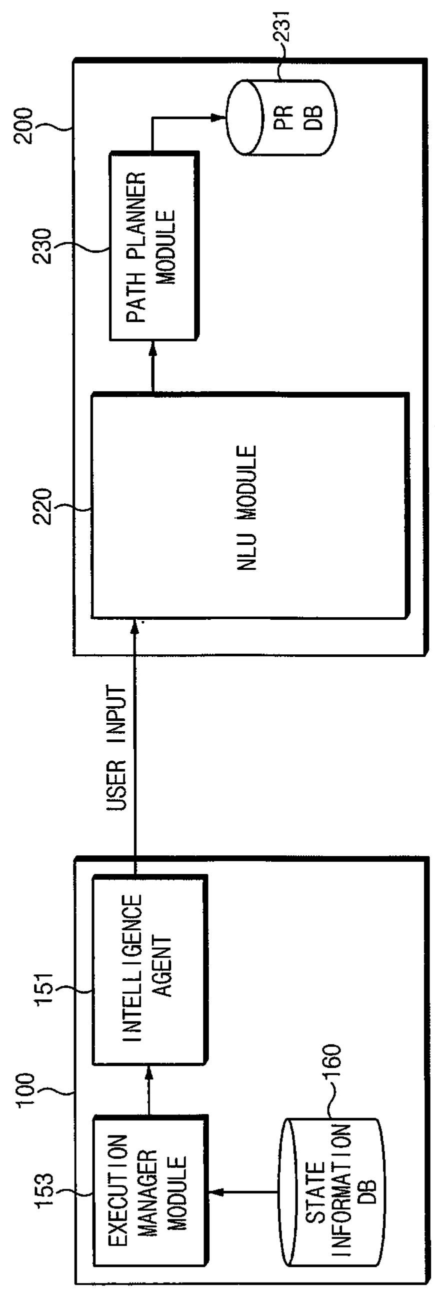

FIGS. 11A, 11B, and 11C are views illustrating that an intelligence server generates a path rule corresponding to a user input by using state information of a user terminal, according to an embodiment.

Referring to FIG. 11A, the intelligence server 200 (e.g., the NLU module 220) may generate the path rule corresponding to the user input and the state information of the user terminal 100.

According to an embodiment, the intelligence server 200 may determine the path rule corresponding to the user input from a path rule set corresponding to the state information (e.g., meta data) of the user terminal 100. For example, the state information of the user terminal 100 may include information about at least one of the type of the device, the installed app, the version of the app, the used area, the set country, and the telecommunications company. According to an embodiment, the intelligence server 200 may select a path rule depending on the version of the app installed in the user terminal 100 to transmit the selected path rule to the user terminal 100 and may not transmit a path rule, which is not matched to the version of the app to the user terminal 100. The selected path rule may be a path rule similar to the intent of a user input and a parameter from a path rule set corresponding to the version of the app installed in the user terminal 100. The intelligence server 200 may receive a feedback on the selected path rule from a user.

Referring to FIG. 11B, the intelligence server 200 (e.g., the NLU module 220) may generate the path rule corresponding to the user input and the state information of the user terminal 100.

According to an embodiment, the intelligence agent 151 of the user terminal 100 may receive the state information (e.g., version information of the installed app or an app) of the user terminal 100, from the execution manager module 153. The intelligence agent 151 may transmit a user input ① and state information ② to the intelligence server 200.

According to an embodiment, the ASR module 210 of the intelligence server 200 may convert the user input ① into text data and then may transmit the text data to the NLU module 220. According to an embodiment, the path planner module 230 of the intelligence server 200 may receive state information ② of the user terminal 100 and then may receive a path rule set corresponding to the state information ② from a database (e.g., the PR DB 231). According to an embodiment, the NLU module 220 may select the path rule corresponding to the user input, using the user input ① (or the text data) and the first path rule set. For example, the NLU module 220 may receive the path rule set corresponding to the state information ② from the path planner module 230 and may select the first path rule (or the dynamic caller path rule) corresponding to the user input ① among the path rule set through the domain classifier 220*a* and the intent classifier 220*b*.

According to an embodiment, the path planner module 230 may select a second path rule (or a dynamic callee path rule) corresponding to the user input ① among the path rule set corresponding to the state information ②, using information about parameters obtained through the slot tagger 220*c* of the NLU module 220. According to an embodiment, the path planner module 230 may generate a third path rule (or a full path rule) capable of being executed in the current state of the user terminal 100, by combining the first path rule and the second path rule.

As such, the intelligence server 200 may generate a path rule capable of being executed in the current state of the user terminal 100, thereby preventing the conflict (e.g., an error) capable of occurring when the user terminal 100 executes the action of an app depending on the path rule.

Referring to FIG. 11C, when the state information of the user terminal 100 is updated, the intelligence server 200 may update the state information in a database (e.g., the PR DB 231). For example, the execution manager module 153 of the user terminal 100 may transmit the updated state information of a state information database 160 to the intelligence agent 151. In the case where the intelligence server 200 is capable of receiving the state information of the user terminal 100 (or in the case where the intelligence server 200 opens a session), the intelligence agent 151 may transmit the updated state information to the intelligence server 200. The NLU module 220 of the intelligence server 200 may receive the updated state information may update the state information of the user terminal 100 through the path planner module 230. As such, even though not receiving the state information from the user terminal 100, the intelligence server 200 may generate the path rule corresponding to the user input by using the state information of the user terminal 100 stored in a database (e.g., the PR DB 231).

Figure 12:
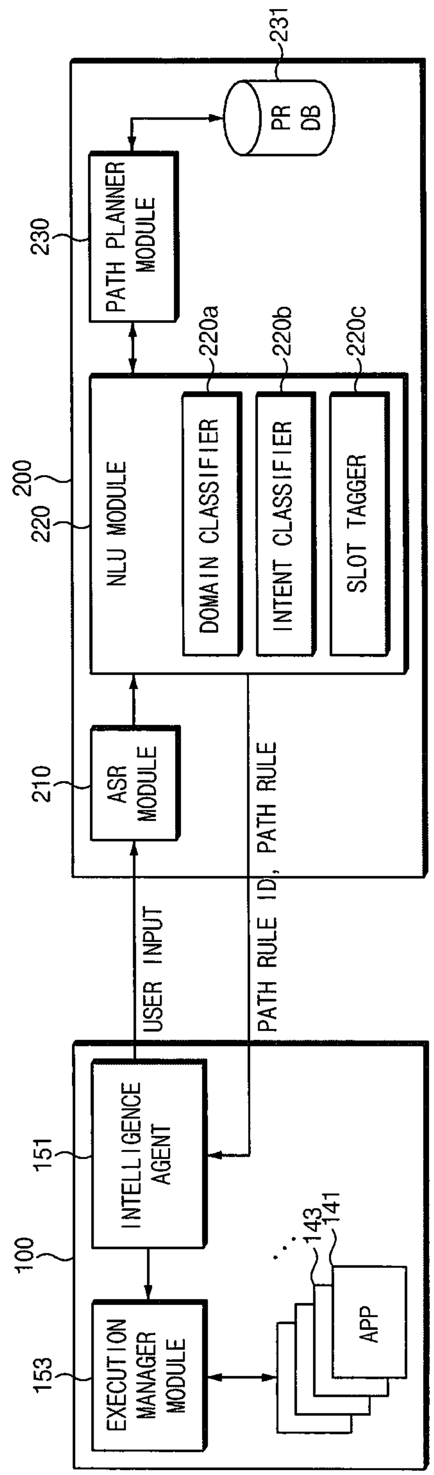
FIG. 12 is a view illustrating that an intelligence server transmits not only a path rule but also path rule identification (ID) to a user terminal, according to an embodiment.

FIG. 12 is a view illustrating that an intelligence server transmits not only a path rule but also path rule identification (ID) to a user terminal, according to an embodiment.

Referring to FIG. 12, similarly to FIG. 10, the intelligence server 200 may transmit the path rule (or a full path rule) generated by combining a dynamic caller path rule and a dynamic callee path rule, to the user terminal 100. Moreover, the intelligence server 200 may transmit a path rule ID (e.g., identifier) corresponding to the generated path rule together with the generated path rule, to the user terminal 100.

According to an embodiment, the intelligence server 200 may transmit the path rule ID corresponding to the generated path rule as well as the generated path rule, to the user terminal 100. For example, the path rule ID may be ID for distinguishing the generated path rule from another path rule stored in a database (e.g., the PR DB 231). According to an embodiment, the intelligence server 200 (e.g., the NLU module 220) may generate the path rule ID corresponding to the generated path rule. For example, the intelligence server 200 may generate a third path rule ID corresponding to the generated path rule, based on a first path rule ID corresponding to the dynamic caller path rule and a second path rule ID corresponding to a dynamic callee path rule For another example, the intelligence server 200 may determine that a specified path rule ID is the ID corresponding to the generated path rule.

According to an embodiment, the user terminal 100 (e.g., the intelligence agent 151) may recognize the path rule ID and may execute the actions of the apps 141 and 143 depending on the received path rule.

Figure 13:
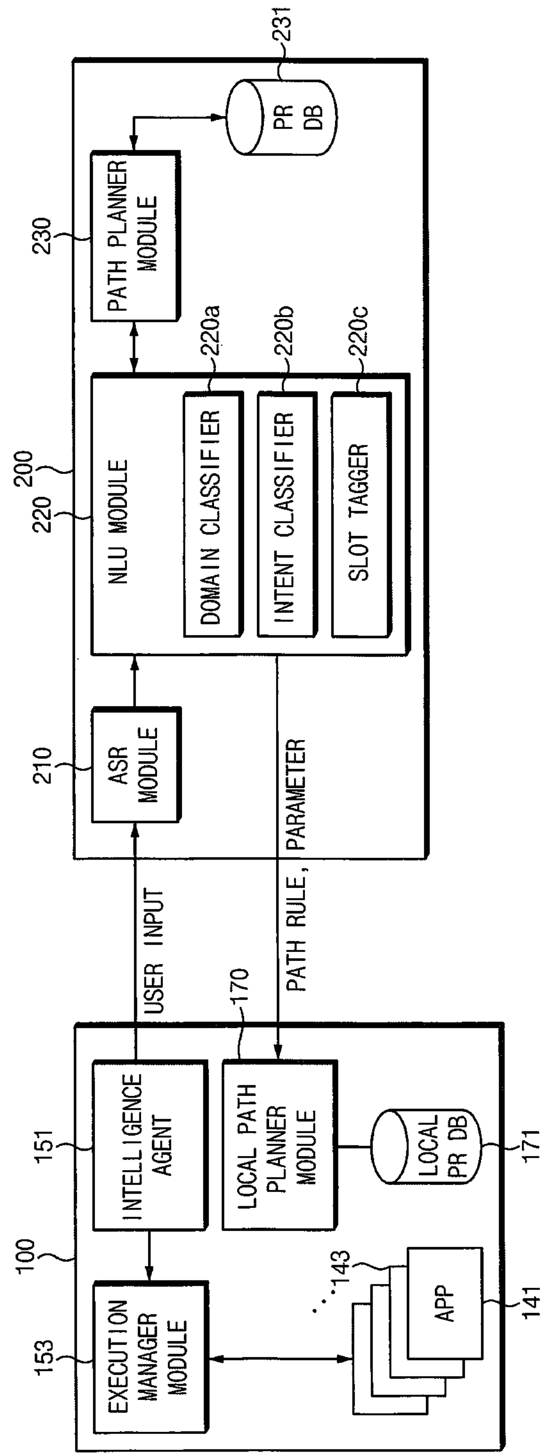
FIG. 13 is a view illustrating that a user terminal generates a path rule corresponding to a user input, according to an embodiment.

FIG. 13 is a view illustrating that a user terminal generates a path rule corresponding to a user input, according to an embodiment.

Referring to FIG. 13, the user terminal 100 may generate a path rule corresponding to a user input, using the path rule received from the intelligence server 200 and information about a parameter. The user terminal 100 may further include a local path planner module 170 and a local path rule database (or a local PR DB) 171 for generating a path rule. Similarly to the path planner module 230 of the intelligence server 200, the local path planner module 170 may combine another path rule (or a dynamic callee path rule) with a single path rule (or a dynamic caller path rule). Similarly to the PR DB 231 of the intelligence server 200, the local PR DB 171 may store the path rule (or a dynamic callee path rule) of an app.

According to an embodiment, the user terminal 100 (e.g., the intelligence agent 151) may transmit the received user utterance to the intelligence server 200. According to an embodiment, the ASR module 210 may convert the user input into text data to transmit the converted text data to the NLU module 220. According to an embodiment, the NLU module 220 may select a first path rule (or a dynamic caller path rule) corresponding to the user input through a domain classifier 220*a* and an intent classifier 220*b*. The NLU module 220 may obtain a parameter necessary for an action corresponding to the user input, through a slot tagger 220*c*. According to an embodiment, the NLU module 220 may select the first path rule corresponding to the user input through the path planner module 230 with reference to the path rule of an app stored in a database (e.g., the PR DB 231). According to an embodiment, the NLU module 220 may transmit the first path rule and information about the generated parameter to the user terminal 100.

According to an embodiment, the local path planner module 170 of the user terminal 100 may generate a second path rule (or a dynamic callee path rule), using the first path rule and the information about the parameter. For example, the local path planner module 170 may select the second path rule stored in the local PR DB 171, using the information about the parameter. According to an embodiment, the path planner module 170 may generate a third path rule (or a full path rule), using the first path rule and the second path rule. According to an embodiment, the intelligence agent 151 may execute the actions of the apps 141 and 143 through the execution manager module 153 depending on the third path rule received from the local path planner module 170.

According to an embodiment, the local path planner module 170 may obtain the path rule (or a dynamic callee path rule) of an app installed in the user terminal 100, from the intelligence server 200 through the intelligence agent 151.

Figure 14A:
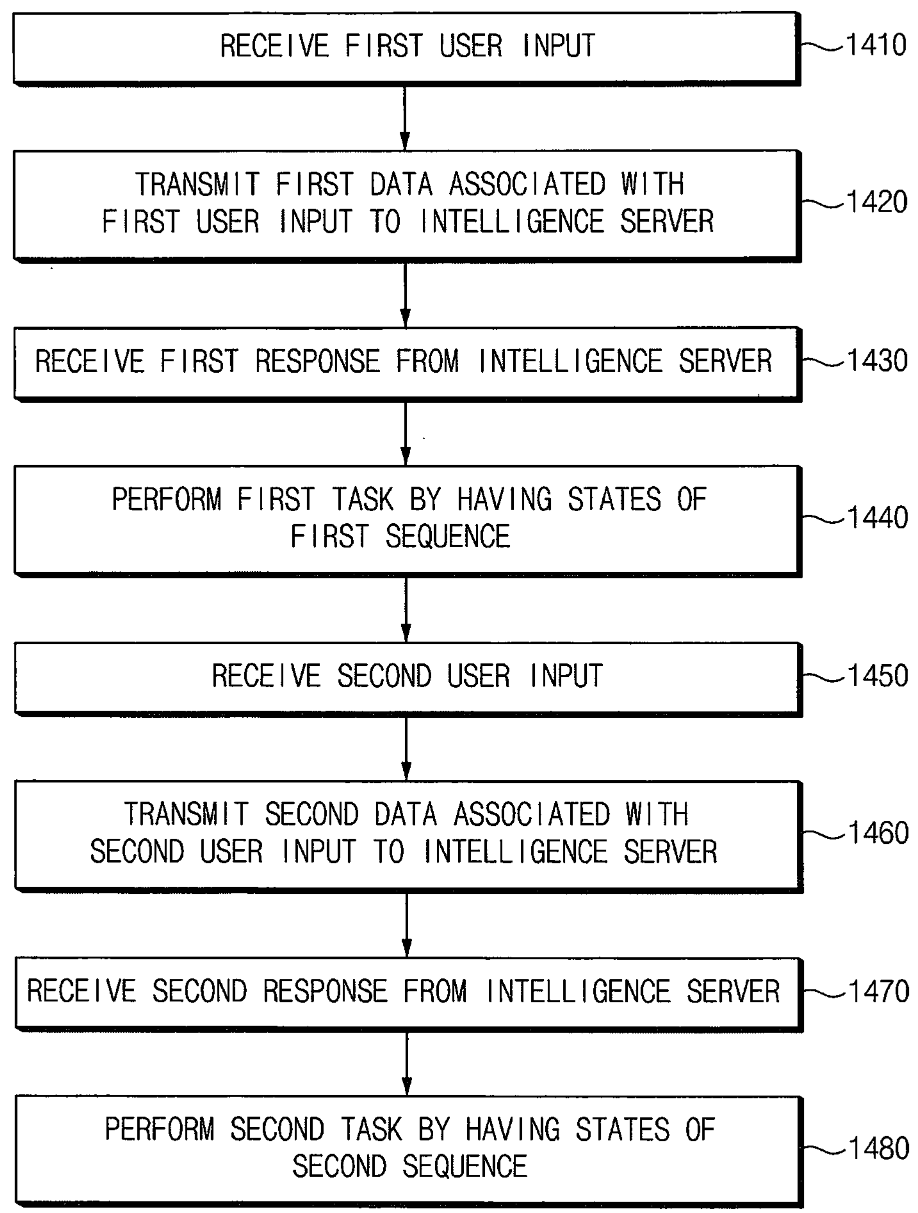
FIG. 14A is a flowchart illustrating a method in which a user terminal processes a user input, according to an embodiment.

FIG. 14A is a flowchart illustrating a method in which a user terminal processes a user input, according to an embodiment.

According to an embodiment, in operation 1410, the user terminal 100 (e.g., the processor 150) may receive a first user input. For example, the user terminal 100 may receive the first user input through at least one of the display 120 and a microphone. For example, the first user input may include a first request for performing a first task, using a first app and a second app.

According to an embodiment, in operation 1420, the user terminal 100 (e.g., the processor 150) may transmit first data associated with the first user input to the intelligence server 200.

According to an embodiment, in operation 1430, the user terminal 100 (e.g., the processor 150) may receive a first response from the intelligence server 200. For example, the first response may include information about a first sequence of the states of the user terminal 100 for performing the first task and a first combination of a first identifier associated with the first app and a second identifier associated with the second app.

According to an embodiment, in operation 1440, the user terminal 100 (e.g., the processor 150) may perform the first task by having the states of the first sequence.

According to an embodiment, in operation 1450, the user terminal 100 (e.g., the processor 150) may receive a second user input. For example, the user terminal 100 may receive the second user input through at least one of the display 120 and the microphone. For example, the first user input may include a second request for performing a second task, using the first app and a third app.

According to an embodiment, in operation 1460, the user terminal 100 (e.g., the processor 150) may transmit second data associated with the second user input to the intelligence server 200.

According to an embodiment, in operation 1470, the user terminal 100 (e.g., the processor 150) may receive a second response from the intelligence server 200. For example, the second response may include information about a second sequence of the states of the user terminal 100 for performing the second task and a second combination of the first identifier associated with the first app and a third identifier associated with the third app.

According to an embodiment, in operation 1480, the user terminal 100 (e.g., the processor 150) may perform the second task by having the states of the second sequence.

Figure 14B:
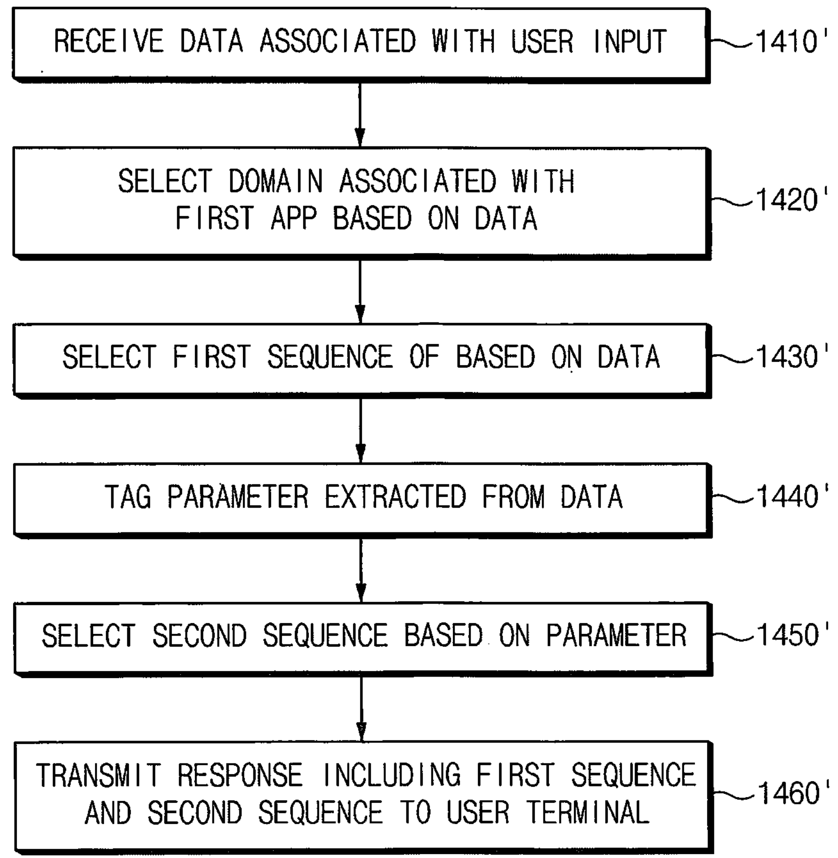
FIG. 14B is a flowchart illustrating a method in which the intelligence server 200 generates a path rule corresponding to a user input, according to an embodiment.

FIG. 14B is a flowchart illustrating a method in which the intelligence server 200 generates a path rule corresponding to a user input, according to an embodiment.

According to an embodiment, in operation 1410', the intelligence server 200 (e.g., the ASR module 210) may receive data associated with a user input. For example, the data may be associated with a user input for performing a first task, using a first app and a second app.

According to an embodiment, in operation 1420', the intelligence server 200 (e.g., the NLU module 220) may select the domain associated with the first app based on the data.

According to an embodiment, in operation 1430', the intelligence server 200 (e.g., the NLU module 220) may select the first sequence of states for the user terminal 100, based on the data. The first sequence may use the first app.

According to an embodiment, in operation 1440', the intelligence server 200 (e.g., the NLU module 220) may tag the parameter extracted from the data.

According to an embodiment, in operation 1450', the intelligence server 200 (e.g., the path planner module 230) may select the second sequence for the execution of the user terminal 100, based on the tagged parameter. For example, the second sequence may use the second app.

According to an embodiment, in operation 1460', the intelligence server 200 (e.g., the path planner module 230) may transmit a response including the first sequence and the second sequence, to the user terminal 100.

According to various embodiments described in FIGS. 1 to 14B, the intelligence server 200 may generate a path rule (or full path rule) corresponding to a user input in real time by combining the path rules corresponding to the functions of an app, thereby reducing the amount of information to be stored in a database and efficiently processing the user input corresponding to the newly added path rule, organically using the path rule newly added to the database together with the existing path rule.

Figure 15:
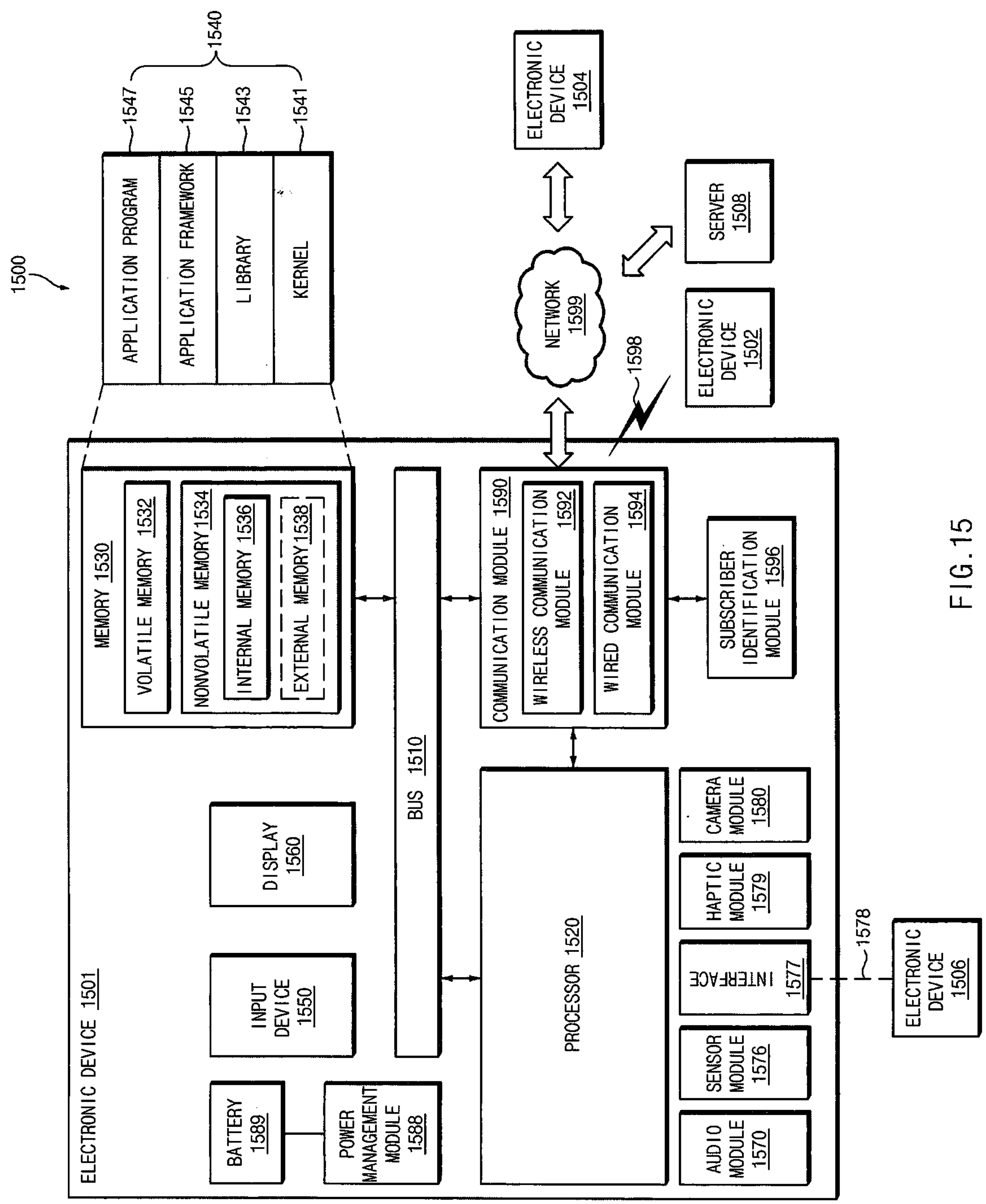
FIG. 15 illustrates a block diagram of an electronic device in a network environment, according to various embodiments.

FIG. 15 illustrates a block diagram of an electronic device 1501 in a network environment 1500, according to various embodiments. An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

Referring to FIG. 15, under the network environment 1500, the electronic device 1501 (e.g., the user terminal 100 of FIG. 1) may communicate with an electronic device 1502 through local wireless communication 1598 or may communication with an electronic device 1504 or a server 1508 through a network 1599. According to an embodiment, the electronic device 1501 may communicate with the electronic device 1504 through the server 1508.

According to an embodiment, the electronic device 1501 may include a bus 1510, a processor 1520 (e.g., the processor 150 of FIG. 2), a memory 1530, an input device 1550 (e.g., a microphone or a mouse), a display device 1560, an audio module 1570, a sensor module 1576, an interface 1577, a haptic module 1579, a camera module 1580, a power management module 1588, a battery 1589, a communication module 1590, and a subscriber identification module 1596. According to an embodiment, the electronic device 1501 may not include at least one (e.g., the display device 1560 or the camera module 1580) of the above-described components or may further include other component(s).

The bus 1510 may interconnect the above-described components 1520 to 1590 and may include a circuit for conveying signals (e.g., a control message or data) between the above-described components.

The processor 1520 may include one or more of a central processing unit (CPU), an application processor (AP), a graphic processing unit (GPU), an image signal processor (ISP) of a camera or a communication processor (CP). According to an embodiment, the processor 1520 may be implemented with a system on chip (SoC) or a system in package (SiP). For example, the processor 1520 may drive an operating system (OS) or an application program to control at least one of another component (e.g., hardware or software component) of the electronic device 1501 connected to the processor 1520 and may process and compute various data. The processor 1520 may load a command or data, which is received from at least one of other components (e.g., the communication module 1590), into a volatile memory 1532 to process the command or data and may store the result data into a nonvolatile memory 1534.

The memory 1530 may include, for example, the volatile memory 1532 or the nonvolatile memory 1534. The volatile memory 1532 may include, for example, a random access memory (RAM) (e.g., a dynamic RAM (DRAM), a static RAM (SRAM), or a synchronous DRAM (SDRAM)). The nonvolatile memory 1534 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1534 may be configured in the form of an internal memory 1536 or the form of an external memory 1538 which is available through connection only if necessary, according to the connection with the electronic device 1501. The external memory 1538 may further include a flash drive such as compact flash (CF), secure digital (SD), micro secure digital (Micro-SD), mini secure digital (Mini-SD), extreme digital (xD), a multimedia card (MMC), or a memory stick. The external memory 1538 may be operatively or physically connected with the electronic device 1501 in a wired manner (e.g., a cable or a universal serial bus (USB)) or a wireless (e.g., Bluetooth) manner.

For example, the memory 1530 may store, for example, at least one different software component, such as a command or data associated with the program 1540, of the electronic device 1501. The program 1540 may include, for example, a kernel 1541, a library 1543, an application framework 1545 or an application program (interchangeably, "application") 1547.

The input device 1550 may include a microphone, a mouse, or a keyboard. According to an embodiment, the keyboard may include a keyboard physically connected or a virtual keyboard displayed through the display device 1560.

The display device 1560 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1501.

The audio module 1570 may convert, for example, from a sound into an electrical signal or from an electrical signal into the sound. According to an embodiment, the audio module 1570 may acquire sound through the input device 1550 (e.g., a microphone) or may output sound through an output device (not illustrated) (e.g., a speaker or a receiver) included in the electronic device 1501, an external electronic device (e.g., the electronic device 1502 (e.g., a wireless speaker or a wireless headphone)) or an electronic device 1506 (e.g., a wired speaker or a wired headphone) connected with the electronic device 1501

The sensor module 1576 may measure or detect, for example, an internal operating state (e.g., power or temperature) of the electronic device 1501 or an external environment state (e.g., an altitude, a humidity, or brightness) to generate an electrical signal or a data value corresponding to the information of the measured state or the detected state. The sensor module 1576 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1576 may further include a control circuit for controlling at least one or more sensors included therein. According to an embodiment, the electronic device 1501 may control the sensor module 1576 by using the processor 1520 or a processor (e.g., a sensor hub) separate from the processor 1520. In the case that the separate processor (e.g., a sensor hub) is used, while the processor 1520 is in a sleep state, the separate processor may operate without awakening the processor 1520 to control at least a portion of the operation or the state of the sensor module 1576.

According to an embodiment, the interface 1577 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 1578 may physically connect the electronic device 1501 and the electronic device 1506. According to an embodiment, the connector 1578 may include, for example, an USB connector, an SD card/MMC connector, or an audio connector (e.g., a headphone connector).

The haptic module 1579 may convert an electrical signal into mechanical stimulation (e.g., vibration or motion) or into electrical stimulation. For example, the haptic module 1579 may apply tactile or kinesthetic stimulation to a user. The haptic module 1579 may include, for example, a motor, a piezoelectric element, or an electric stimulator.

The camera module 1580 may capture, for example, a still image and a moving picture. According to an embodiment, the camera module 1580 may include at least one lens (e.g., a wide-angle lens and a telephoto lens, or a front lens and a rear lens), an image sensor, an image signal processor, or a flash (e.g., a light emitting diode or a xenon lamp).

The power management module 1588, which is to manage the power of the electronic device 1501, may constitute at least a portion of a power management integrated circuit (PMIC).

The battery 1589 may include a primary cell, a secondary cell, or a fuel cell and may be recharged by an external power source to supply power at least one component of the electronic device 1501.

The communication module 1590 may establish a communication channel between the electronic device 1501 and an external device (e.g., the first external electronic device 1502, the second external electronic device 1504, or the server 1508). The communication module 1590 may support wired communication or wireless communication through the established communication channel. According to an embodiment, the communication module 1590 may include a wireless communication module 1592 or a wired communication module 1594. The communication module 1590 may communicate with the external device through a first network 1598 (e.g. a wireless local area network such as Bluetooth or infrared data association (IrDA)) or a second network 1599 (e.g., a wireless wide area network such as a cellular network) through a relevant module among the wireless communication module 1592 or the wired communication module 1594.

The wireless communication module 1592 may support, for example, cellular communication, local wireless communication, and global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The local wireless communication may include wireless fidelity (Wi-Fi), Wi-Fi Direct, light fidelity (Li-Fi), Bluetooth, Bluetooth low energy (BLE), ZigBee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 1592 supports cellar communication, the wireless communication module 1592 may, for example, identify or authenticate the electronic device 1501 within a communication network using the subscriber identification module (e.g., a SIM card) 1596. According to an embodiment, the wireless communication module 1592 may include a communication processor (CP) separate from the processor 1520 (e.g., an application processor (AP)). In this case, the communication processor may perform at least a portion of functions associated with at least one of components 1510 to 1596 of the electronic device 1501 in substitute for the processor 1520 when the processor 1520 is in an inactive (sleep) state, and together with the processor 1520 when the processor 1520 is in an active state. According to an embodiment, the wireless communication module 1592 may include a plurality of communication modules, each supporting only a relevant communication scheme among cellular communication, local wireless communication, or a GNSS communication.

The wired communication module 1594 may include, for example, a local area network (LAN) service, a power line communication, or a plain old telephone service (POTS).

For example, the first network 1598 may employ, for example, Wi-Fi direct or Bluetooth for transmitting or receiving commands or data through wireless direct connection between the electronic device 1501 and the first external electronic device 1502. The second network 1599 may include a telecommunication network (e.g., a computer network such as a LAN or a WAN, the Internet or a telephone network) for transmitting or receiving commands or data between the electronic device 1501 and the second electronic device 1504.

According to various embodiments, the commands or the data may be transmitted or received between the electronic device 1501 and the second external electronic device 1504 through the server 1508 (e.g., the intelligent server 200 of FIG. 1) connected with the second network 1599. Each of the first and second external electronic devices 1502 and 1504 may be a device of which the type is different from or the same as that of the electronic device 1501. According to various embodiments, all or a part of operations that the electronic device 1501 will perform may be executed by another or a plurality of electronic devices (e.g., the electronic devices 1502 and 1504 or the server 1508). According to an embodiment, in the case that the electronic device 1501 executes any function or service automatically or in response to a request, the electronic device 1501 may not perform the function or the service internally, but may alternatively or additionally transmit requests for at least a part of a function associated with the electronic device 1501 to any other device (e.g., the electronic device 1502 or 1504 or the server 1508). The other electronic device (e.g., the electronic device 1502 or 1504 or the server 1508) may execute the requested function or additional function and may transmit the execution result to the electronic device 1501. The electronic device 1501 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 1530).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 1530) in the form of a program module. The instruction, when executed by a processor (e.g., the processor 1520), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The invention claimed is:

1. An electronic device comprising:

a housing;

a touch screen display positioned inside the housing and exposed through a first portion of the housing;

a microphone positioned inside the housing and exposed through a second portion of the housing;

at least one speaker positioned inside the housing and exposed through a third portion of the housing;

a communication circuit positioned inside the housing;

a processor positioned inside the housing and electrically connected to the touch screen display, the microphone, the at least one speaker, and the communication circuit; and a memory positioned in the housing and electrically connected with the processor, wherein the memory configured to store a plurality of application programs including a first application program, a second application program, and a third application program, wherein the second application program and the third application program includes at least one common function, and wherein the memory stores instructions that, when executed, cause the processor to:

in a first operation, receive a first user input via at least one of the touch screen display and the microphone, wherein the first user input includes a first request for performing a first task, using the first application program and the second application program;

transmit first data associated with the first user input to an external server via the communication circuit;

receive a first response from the external server via the communication circuit, wherein the first response includes information about a first sequence of states of the electronic device for performing the first task and a first combination of a first identifier associated with the first application program and a second identifier associated with the second application program;

perform the first task by causing the electronic device to have the states of the first sequence;

in a second operation, receive a second user input via at least one of the touch screen display and the microphone, wherein the second user input includes a second request for performing a second task, using the first application program and the third application program;

transmit second data associated with the second user input to the external server via the communication circuit;

receive a second response from the external server via the communication circuit, wherein the second response includes information about a second sequence of states of the electronic device for performing the second task and a second combination of the first identifier associated with the first application program and a third identifier associated with the third application program; and perform the second task by causing the electronic device to have the states of the second sequence.

2. The electronic device of claim 1, wherein the first application program is a gallery application program, an image editing application program, or a document editing application program.

3. The electronic device of claim 1, wherein the at least one common function is one or more of messaging, emailing, or texting.

4. The electronic device of claim 1, wherein the identifier is identification (ID) for distinguishing a sequence of the plurality of application programs, wherein the first sequence includes a sequence corresponding to the first identifier and a sequence corresponding to the second identifier, and wherein the second sequence includes a sequence corresponding to the first identifier and a sequence corresponding to the third identifier.

5. The electronic device of claim 1, wherein the instructions cause the processor to:

transmit version information about at least one of the first application program, the second application program, or the third application program to the external server via the communication circuit, together with or after the first data or the second data.

6. The electronic device of claim 1, wherein the first combination is a fourth identifier generated based on the first identifier and the second identifier, wherein the second combination is a fifth identifier generated based on the first identifier and the third identifier, and wherein the instructions cause the processor to:

perform the first task by recognizing the fourth identifier to cause the electronic device to have the states of the first sequence; and perform the second task by recognizing the fifth identifier to cause the electronic device to have the states of the second sequence.

7. The electronic device of claim 1, wherein the instructions cause the processor to:

cause the electronic device to have the states of the first sequence by executing actions of the first application program and actions of the second application program, which respectively correspond to states included in the first sequence; and cause the electronic device to have the states of the second sequence by sequentially executing actions of the first application program and actions of the third application program, which respectively correspond to states included in the second sequence.

8. A server comprising:

a communication interface;

a processor electrically connected to the communication interface; and a memory electrically connected to the processor and configured to store instructions, wherein the instructions, when executed, cause the processor to:

receive first data associated with a first user input for performing a first task using a first application program and a second application program via the communication interface from an external device including a first application program, a second application program, and a third application program, wherein the second application program and the third application program include at least one common function;

select a domain associated with the first application program based on the first data;

select a first sequence of states for the external device based on the first data, wherein the first sequence includes states of the first application program;

tag first parameters extracted from the first data;

select a second sequence for execution of the external device based on at least part of the tagged first parameters, wherein the second sequence includes states of the second application program; and transmit a first response including a combination of the first sequence and the second sequence to the external device via the communication interface.

9. The server of claim 8, wherein the instructions cause the processor to:

receive second data associated with a second user input for performing a second task using the first application program and the third application program, via the communication interface;

tag second parameters extracted from the second data;

select a third sequence for execution of the external device based on at least part of the tagged second parameters, wherein the third sequence is configured to use the third application program; and transmit a second response including the first sequence and the third sequence to the external device via the communication interface.

10. The server of claim 8, wherein the instructions cause the processor to:

generates the fourth sequence by combining the first sequence and the second sequence; and transmit the first response including the fourth sequence to the external device via the communication interface.

11. The server of claim 8, wherein the first parameters are a value necessary to execute an action of the second application program corresponding to the second sequence.

12. The server of claim 8, wherein the first parameters include a name of the second application program, content generated by an action of the first application program according to the first sequence, and recipients receiving the content.

13. The server of claim 8, wherein the instructions cause the processor to:

receive version information about at least one of the first application program, the second application program, or the third application program from the external device via the communication interface, together with or after the first data.

14. The server of claim 13, wherein the instructions cause the processor to:

select the first sequence based on the first data and the version information; and select the second sequence based on at least part of the first parameters and the version information.

15. An electronic device comprising:

a housing;

a touch screen display positioned inside the housing and exposed through a first portion of the housing;

a microphone positioned inside the housing and exposed through a second portion of the housing;

at least one speaker positioned inside the housing and exposed through a third portion of the housing;

a communication circuit positioned inside the housing;

a processor positioned inside the housing and electrically connected to the touch screen display, the microphone, the at least one speaker, and the communication circuit; and a memory positioned in the housing and electrically connected with the processor, wherein the memory configured to store a plurality of application programs including a first application program, a second application program, and a third application program, wherein the second application program and the third application program includes at least one common function, and wherein the memory stores instructions that, when executed, cause the processor to:

receive a first user input via at least one of the touch screen display and the microphone, wherein the first user input includes a first request for performing a first task, using the first application program and the second application program;

transmit first data associated with the first user input to an external server via the communication circuit;

receive a first response from the external server via the communication circuit, wherein the first response includes information about a first sequence of states of the electronic device for performing at least part of the first task, an identifier associated with the first application program, and a first parameter tagged after being extracted from the first data;

select a second sequence of states of the electronic device for performing a remaining of the first task, based on at least part of the tagged first parameters; and perform the first task by causing the electronic device to have the states of the first sequence and the second sequence.

* * * * *